United States Patent
Kawasaki

(10) Patent No.: US 10,476,536 B1
(45) Date of Patent: Nov. 12, 2019

(54) DISTORTION COMPENSATION DEVICE AND DISTORTION COMPENSATION METHOD

(71) Applicant: FUJITSU LIMITED, Kawasaki-shi, Kanagawa (JP)

(72) Inventor: Toshio Kawasaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/295,794

(22) Filed: Mar. 7, 2019

(30) Foreign Application Priority Data

May 17, 2018 (JP) .................................. 2018-095444

(51) Int. Cl.
*H04B 1/62* (2006.01)
*H04B 1/04* (2006.01)

(52) U.S. Cl.
CPC ............. *H04B 1/0475* (2013.01); *H04B 1/62* (2013.01)

(58) Field of Classification Search
CPC ...... H04B 1/62; H04B 1/0475; H04B 1/0483; H04B 3/04; H04B 3/06; H03F 1/3247; H03F 1/0222; H03F 1/3282; G06F 17/5009; H04L 67/10
See application file for complete search history.

(56) References Cited

U.S. PATENT DOCUMENTS

| | | | |
|---|---|---|---|
| 2006/0029155 A1* | 2/2006 | Shako | H03F 1/3247 375/296 |
| 2007/0229180 A1 | 10/2007 | Shimizu et al. | |
| 2008/0243971 A1* | 10/2008 | Po | H04N 19/48 708/4 |
| 2009/0023402 A1 | 1/2009 | Shimizu et al. | |
| 2009/0108952 A1 | 4/2009 | Shimizu et al. | |
| 2009/0190647 A1 | 7/2009 | Utsunomiya et al. | |
| 2010/0222015 A1 | 9/2010 | Shimizu et al. | |
| 2014/0139287 A1 | 5/2014 | Oishi et al. | |
| 2014/0191798 A1 | 7/2014 | Lozhkin | |
| 2016/0173147 A1* | 6/2016 | Ishikawa | H04B 1/0475 375/296 |
| 2017/0149458 A1* | 5/2017 | Ota | H04B 1/0475 |
| 2017/0331435 A1* | 11/2017 | Komatsuzaki | H03F 1/3247 |

(Continued)

FOREIGN PATENT DOCUMENTS

| | | |
|---|---|---|
| JP | 2004-128833 A | 4/2004 |
| JP | 2004-363793 A | 12/2004 |

(Continued)

*Primary Examiner* — Thanh C Le
(74) *Attorney, Agent, or Firm* — Arent Fox LLP

(57) ABSTRACT

A distortion compensation device includes an electric power amplifier that amplifies a transmission signal, and a processor that executes a process including: first identifying, by using a series that includes a plurality of coefficients or by using a look-up table that stores therein distortion compensation coefficients, an inverse characteristic of nonlinear distortion generated in the transmission signal in the electric power amplifier; second identifying, by using a plurality of coefficients, an inverse characteristic of linear distortion generated in the transmission signal in the electric power amplifier; and setting the coefficients for the first identifying and the second identifying such that a coefficient of a term with a degree of 1 in the series used in the first identifying or a sum of the plurality of coefficients used in the second identifying is a constant.

8 Claims, 17 Drawing Sheets

(56) References Cited

U.S. PATENT DOCUMENTS

2018/0054170 A1\*  2/2018  Arai .................... H04B 1/0475
2018/0167092 A1\*  6/2018  Hausmair ............ H04B 1/0483

FOREIGN PATENT DOCUMENTS

| JP | 2006-197537 A | 7/2006 |
| JP | 2006-333445 A | 12/2006 |
| JP | 2007-180782 A | 7/2007 |
| JP | 2008-187618 A | 8/2008 |
| JP | 2009-177668 A | 8/2009 |
| JP | 2009-213113 A | 9/2009 |
| JP | 2010-103834 A | 5/2010 |
| JP | 2012-175401 A | 9/2012 |
| JP | 2014-103540 A | 6/2014 |
| JP | 2014-132727 A | 7/2014 |
| JP | 2014-204148 A | 10/2014 |
| JP | 2017-212702 A | 11/2017 |

\* cited by examiner

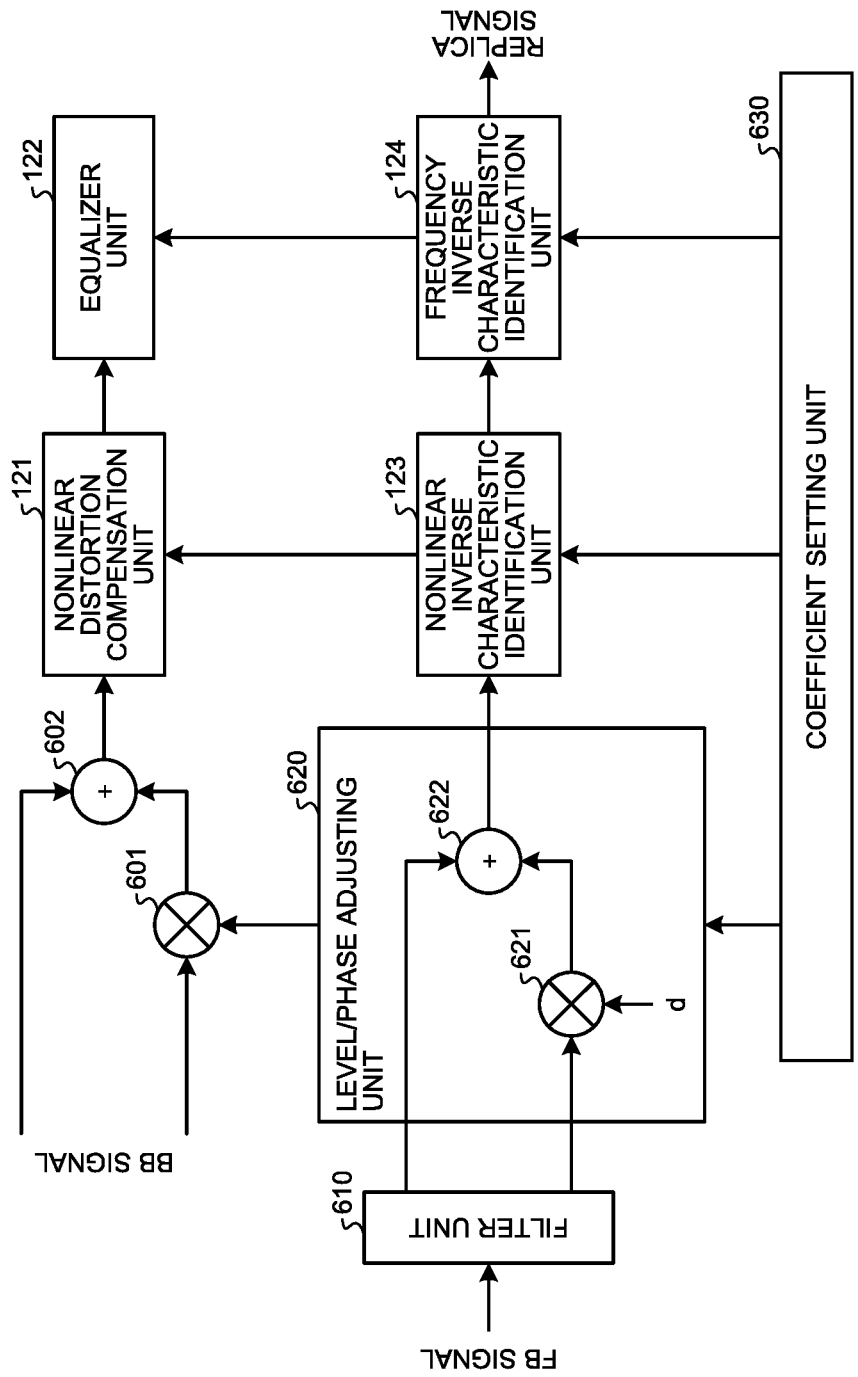

DISTORTION COMPENSATION DEVICE AND DISTORTION COMPENSATION METHOD

CROSS-REFERENCE TO RELATED APPLICATION

This application is based upon and claims the benefit of priority of the prior Japanese Patent Application No. 2018-095444, filed on May 17, 2018, the entire contents of which are incorporated herein by reference.

FIELD

The embodiments discussed herein are related to a distortion compensation device and a distortion compensation method.

BACKGROUND

In recent years, with the increased speed of radio communication, transmission signals each having a wider bandwidth and a higher dynamic range has been improved. Under these circumstances, in order to reduce the degradation of the quality of signals to the minimum, electric power amplifiers having high linearity are needed. Furthermore, at the same time, from the viewpoint of reducing the size of devices and the operation cost and from the viewpoint of environmental issues and the like, there is also a growing need for electric power amplifiers operated with high electric power conversion efficiency.

In commonly used electric power amplifiers, the linearity and the electric power conversion efficiency have a conflicting relationship with each other. For example, it is possible to minimize the occurrence of out-of-band distortion by operating an electric power amplifier in a linear region in which saturation electric power is backed off. However, in this case, the electric power conversion efficiency is considerably reduced, thus resulting in an increase in electrical power consumed in the electric power amplifiers. Therefore, in order to satisfy both the linearity and the electric power conversion efficiency, the linearity is maintained by operating the electric power amplifier in a nonlinear region in which the electric power conversion efficiency is high and by using distortion compensation that removes nonlinear distortion that is generated at that time. A predistortion technique (hereinafter, referred to as a "PD technique"), which is one of modes of the distortion compensation, is a technology for enhancing the linearity of an output of an electric power amplifier by previously adding distortion having the inverse characteristic of nonlinear distortion generated in the electric power amplifier to a transmission signal.

As a method for previously adding distortion to a transmission signal in the PD technique, there are two methods, i.e., a method that uses a look-up table (LUT) and a method that uses a series. In a case of using a LUT, a distortion compensation coefficient associated with a transmission signal is read from the LUT and then the obtained distortion compensation coefficient is multiplied by the transmission signal. In contrast, in a case of using a series, a distortion compensation coefficient associated with a transmission signal is calculated by a series and then the obtained distortion compensation coefficient is multiplied by the transmission signal. The distortion compensation coefficients stored in the LUT and the coefficients included in the series are updated at any time by using, for example, the Least Mean Square (LMS) algorithm.

Patent Document 1: Japanese Laid-open Patent Publication No. 2009-213113
Patent Document 2: Japanese Laid-open Patent Publication No. 2014-132727

Incidentally, an electric power amplifier is sometimes modeled as a circuit that generates, as in the model represented by, for example, the Wiener model, linear distortion and nonlinear distortion. In this way, when applying the PD technique to the electric power amplifier that generates the linear distortion and the nonlinear distortion, it takes time to perform an update process on the LUT or the series. Namely, when a memory polynomial is formed by the LUT or the series, an update process related to a plurality of LUTs or a series is performed and, thus, the time needed for convergence of the distortion compensation coefficients stored in the LUTs or the coefficients included in the series is increased. Furthermore, if it takes time to perform the update process on the LUTs or the series, it is difficult to follow the variation in the characteristics of the electric power amplifier generated due to an environment factor, such as a temperature, to the distortion compensation and thus the performance of the distortion compensation is degraded.

Thus, to reduce the convergence time in the update process, it is conceivable to individually compensate the linear distortion and the nonlinear distortion of the electric power amplifier and individually obtain a distortion compensation coefficient of each of the pieces of distortion. Specifically, for example, it is conceivable to compensate the linear distortion by using an equalizer that is formed by a finite impulse response (FIR) filter, whereas it is conceivable to compensate the nonlinear distortion by using a LUT or a series. In this case, by performing an update process on tap coefficients of the FIR filter and by performing an update process on a single LUT or a series, it is possible to implement distortion compensation with high accuracy and it is thus possible to follow the distortion compensation to the variation in characteristics of the electric power amplifiers.

However, if the distortion compensation coefficients of the linear distortion and the nonlinear distortion are individually obtained, there is a problem in that both of the distortion compensation coefficients interfere with each other and it is thus difficult to uniquely obtain the distortion compensation coefficients. Furthermore, for example, due to an arithmetic calculation error or the like, the obtained distortion compensation coefficients may possibly be drifted.

For example, if a distortion compensation coefficient of nonlinear distortion is expressed by a series, a signal $X_i$ obtained by performing nonlinear distortion compensation on a transmission signal $x_i$ at time i by using a series is expressed by Equation (1) below.

$$X_i = (b1 + b3|x_i|^2 +)x_i \qquad (1)$$

where, in Equation (1), b1 and b3 denote coefficients included in the series. Furthermore, |x| denotes the amplitude of the transmission signal x. Then, a signal $u_i$ obtained by performing linear distortion compensation on a signal $X_i$ by an equalizer is expressed by Equation (2) below.

$$u_i = a1 X_{i-1} + a2 X_i + a3 X_{i+1} \qquad (2)$$

where, in Equation (2), a1, a2, and a3 denote tap coefficients of the FIR filter. When Equation (1) is substituted in Equation (2) indicated above, Equation (3) below can be obtained.

$$u_i=(a1b1+a1b3|x_{i-1}|^2+a1b5|x_{i-1}|^4)x_{i-1}+(a2b1+\\a2b3|x_i|^2+a2b5|x_i|^4)x_i+(a3b1+a3b3|x_{i+1}|^2+\\a3b5|x_{i+1}|^4)x_{i+1} \quad (3)$$

In this way, in each of the terms, the product of the tap coefficients a1, a2, and a3 and coefficients b1, b3, and b5 included in the series are expressed and the terms associated with the linear distortion and the terms associated with the nonlinear distortion interfere with each other. In other words, even if for example, the product of "a1b1" that optimizes the performance of distortion compensation is decided, it is difficult to specify each of the coefficients "a1" and "b1". Therefore, it is difficult to uniquely decide the tap coefficients and the coefficients included in the series, thereby a stable distortion compensation operation may possibly be damaged. This problem also occurs in a case in which the distortion compensation coefficients of nonlinear distortion are read from a LUT.

SUMMARY

According to an aspect of an embodiment, a distortion compensation device includes an electric power amplifier that amplifies a transmission signal, and a processor that executes a process including: first identifying, by using a series that includes a plurality of coefficients or by using a look-up table that stores therein distortion compensation coefficients, an inverse characteristic of nonlinear distortion generated in the transmission signal in the electric power amplifier; second identifying, by using a plurality of coefficients, an inverse characteristic of linear distortion generated in the transmission signal in the electric power amplifier; and setting the coefficients for the first identifying and the second identifying such that a coefficient of a term with a degree of 1 in the series used in the first identifying or a sum of the plurality of coefficients used in the second identifying is a constant.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 17 is a block diagram illustrating a specific example of an amplifier inverse characteristic identification unit.

DESCRIPTION OF EMBODIMENTS

Preferred embodiments of the present invention will be explained with reference to accompanying drawings. The present invention is not limited to the embodiments.

[a] First Embodiment

Figure 1:
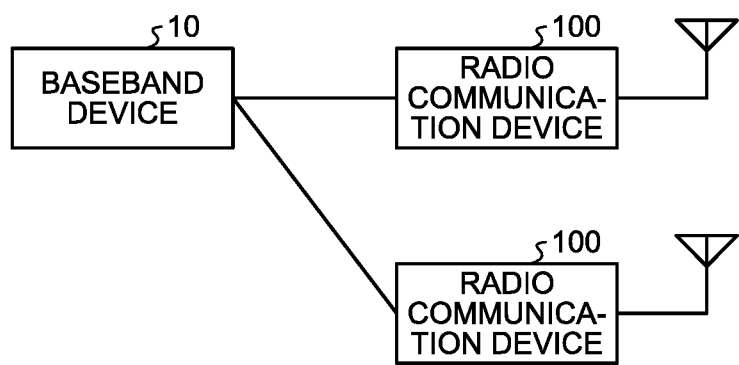
FIG. 1 is a diagram illustrating a configuration of a radio communication system according to a first embodiment.

FIG. 1 is a diagram illustrating a configuration of a radio communication system according to a first embodiment. A radio communication system illustrated in FIG. 1 has a configuration in which a plurality of radio communication devices 100 is connected to a baseband device 10. Furthermore, in FIG. 1, the two radio communication devices 100 are connected to the baseband device 10; however, the number of the radio communication devices 100 connected to the baseband device 10 may also be one or may also be three or more.

The baseband device 10 is connected to, for example, a device of a core network (not illustrated) and performs a baseband process on data that is transmitted to a terminal device. Specifically, the baseband device 10 encodes and modulates transmission data and transmits the obtained baseband signal (hereinafter, simply referred to as a "BB signal") to the radio communication device 100. Furthermore, the BB signal is represented by a complex number. Furthermore, the baseband device 10 receives, via the radio communication device 100, the signal transmitted from the terminal device and performs the baseband process on the reception signal.

The radio communication device 100 receives the BB signal from the baseband device 10; performs a radio transmission process after having performed distortion compensation on the BB signal; and then transmits the obtained radio signal from an antenna to the terminal device. In the radio transmission process performed by the radio communication device 100, the transmission signal is amplified by an electric power amplifier. At this time, because linear distortion and nonlinear distortion are generated in the electric power amplifier, distortion compensation is performed on the BB signal by using the PD technique. Namely, a distortion inverse characteristic of the electric power amplifier is identified and distortion having an inverse characteristic of the distortion generated in the electric power amplifier is previously added to the transmission signal.

Figure 2:
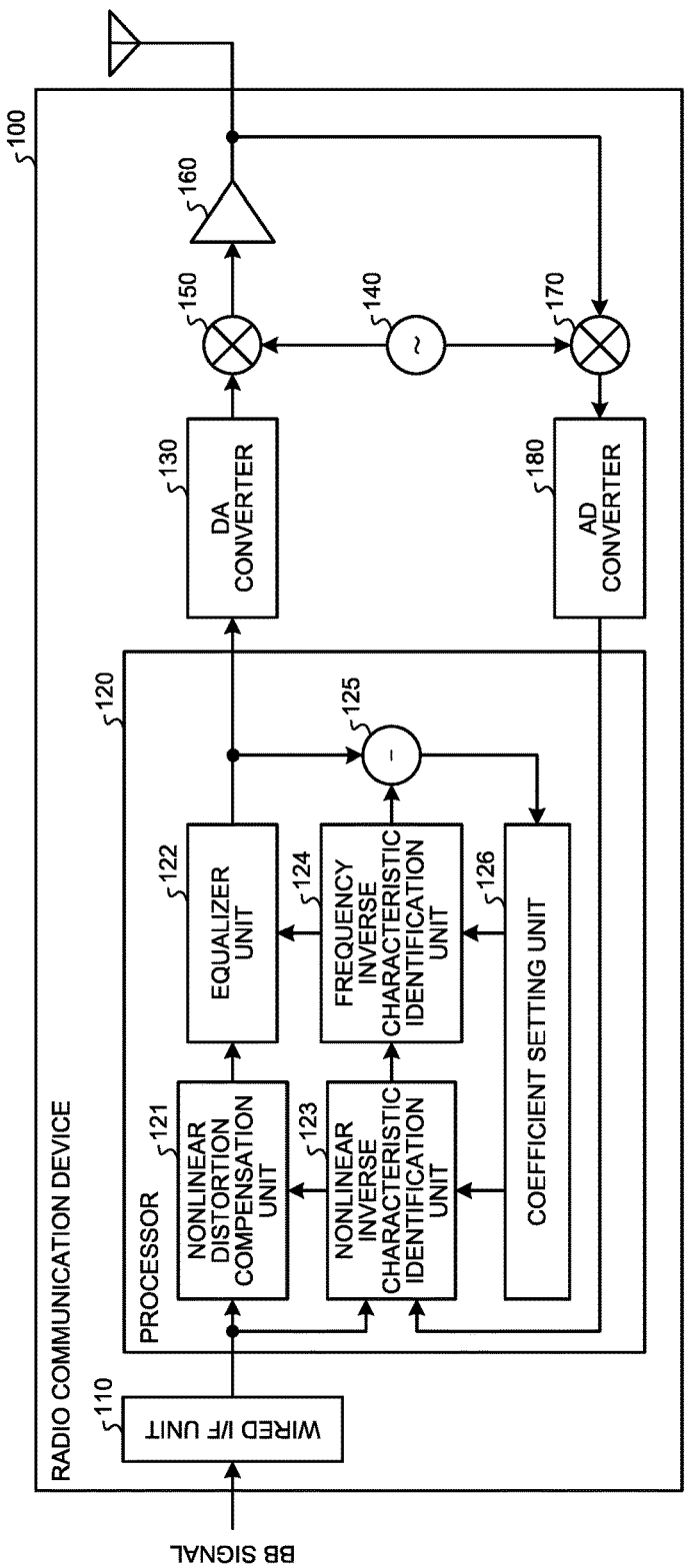
FIG. 2 is a block diagram illustrating a configuration of a radio communication device according to the first embodiment.

FIG. 2 is a block diagram illustrating a configuration of the radio communication device 100 according to the first embodiment. The radio communication device 100 illustrated in FIG. 2 includes a wired interface unit (hereinafter, simply referred to as a "wired I/F unit") 110, a processor 120, a digital-to-analog (DA) converter 130, a local oscillator 140, an up converter 150, an electric power amplifier 160, a down converter 170, and an analog-to-digital (AD) converter 180.

The wired I/F unit 110 is connected to the baseband device 10 in a wired manner and receives the BB signal transmitted from the baseband device 10. Furthermore, the wired I/F unit 110 may also transmit, to the baseband device 10, the signal that is transmitted from a terminal device and that is received by the radio communication device 100.

The processor 120 includes for example, a central processing unit (CPU), a field programmable gate array (FPGA) or a digital signal processor (DSP), and performs overall control of the radio communication device 100. Specifically, the processor 120 includes a nonlinear distortion compensation unit 121, an equalizer unit 122, a nonlinear inverse characteristic identification unit 123, a frequency inverse characteristic identification unit 124, an error calculation unit 125, and a coefficient setting unit 126.

The nonlinear distortion compensation unit 121 compensates the nonlinear distortion generated in the electric power amplifier 160. Specifically, the nonlinear distortion compensation unit 121 includes a LUT that stores therein distortion compensation coefficients in association with electric power of a signal; reads, from the LUT if a BB signal is input, the distortion compensation coefficient associated with the electric power of the BB signal; and multiplies the distortion compensation coefficient by the BB signal. The LUT included in the nonlinear distortion compensation unit 121 is periodically replaced by the LUT that is subjected to an update process in the nonlinear inverse characteristic identification unit 123, which will be described later.

The equalizer unit 122 compensates the linear distortion generated in the electric power amplifier 160. Specifically, the equalizer unit 122 includes the FIR filter that multiplies each of the tap coefficients by a plurality of temporally continuous signal samples and equalizes the BB signal. The tap coefficients of the equalizer unit 122 is periodically replaced by the tap coefficients that are subjected to an update process in the frequency inverse characteristic identification unit 124, which will be described later.

The nonlinear distortion compensation unit 121 and the equalizer unit 122 perform distortion compensation on the BB signal by using the PD technique. Namely, the nonlinear distortion compensation unit 121 and the equalizer unit 122 compensate the linear distortion and the nonlinear distortion generated in the electric power amplifier 160 and then the predistortion signal (hereinafter, simply referred to as a "PD signal") that has been subjected to the distortion compensation is output from the equalizer unit 122.

The nonlinear inverse characteristic identification unit 123 identifies the nonlinear inverse characteristic of the electric power amplifier 160. Specifically, similarly to the nonlinear distortion compensation unit 121, the nonlinear inverse characteristic identification unit 123 includes a LUT and updates the distortion compensation coefficients stored in the LUT such that an error calculated by the error calculation unit 125 is the minimum. Furthermore, the nonlinear inverse characteristic identification unit 123 multiplies the distortion compensation coefficient, which has been read from the LUT in accordance with electric power of the BB signal, by the feedback signal (hereinafter, simply referred to as an "FB signal"), which has been output from the electric power amplifier 160 and fed back, and performs nonlinear distortion compensation on the FB signal. Namely, the nonlinear inverse characteristic identification unit 123 performs the update process on the LUT while performing, on the FB signal, the nonlinear distortion compensation that is the same as that performed by the nonlinear distortion compensation unit 121. Then, the nonlinear inverse characteristic identification unit 123 periodically duplicates the LUT included in the own unit to the nonlinear distortion compensation unit 121.

The frequency inverse characteristic identification unit 124 identifies the frequency inverse characteristic of the electric power amplifier 160. Specifically, similarly to the equalizer unit 122, the frequency inverse characteristic identification unit 124 also includes an FIR filter and updates the tap coefficients of the FIR filter such that an error calculated by the error calculation unit 125 is the minimum. Furthermore, the frequency inverse characteristic identification unit 124 performs linear distortion compensation on the FB signal by equalizing the FB signal that is output from the nonlinear inverse characteristic identification unit 123. Namely, the frequency inverse characteristic identification unit 124 performs the update process on the tap coefficients while performing, on the FB signal, the linear distortion compensation that is the same as that performed by the equalizer unit 122. Then, the frequency inverse characteristic identification unit 124 periodically duplicates the tap coefficients of the FIR filter included in the own unit to the equalizer unit 122.

The tap coefficients of the FIR filter included in the frequency inverse characteristic identification unit 124 are set by the coefficient setting unit 126; however, each of the tap coefficients is not set without limitation but is set under certain limitation. Namely, the update process is performed on the tap coefficients under the limitation in which the sum of the plurality of tap coefficients is set to 1.

The nonlinear inverse characteristic identification unit 123 and the frequency inverse characteristic identification unit 124 identify the frequency inverse characteristic and the nonlinear inverse characteristic of the electric power amplifier 160 while performing distortion compensation on the FB signal by using the PD technique. Namely, the nonlinear inverse characteristic identification unit 123 and the frequency inverse characteristic identification unit 124 perform, on the FB signal, the distortion compensation that is the same as that performed by the nonlinear distortion compensation unit 121 and the equalizer unit 122 and, then, a replica (hereinafter, referred to as a "replica signal") of the PD signal is output from the frequency inverse characteristic identification unit 124. Furthermore, the nonlinear inverse characteristic identification unit 123 and the frequency inverse characteristic identification unit 124 calculate distortion compensation coefficients that compensates the nonlinear distortion and the linear distortion generated in the electric power amplifier 160 and tap coefficients and periodically duplicates the distortion compensation coefficients and the tap coefficients to the nonlinear distortion compensation unit 121 and the equalizer unit 122. In this way, the technique of indirectly learning, by the nonlinear inverse characteristic identification unit 123 and the frequency inverse characteristic identification unit 124, the coefficients that are used by the nonlinear distortion compensation unit 121 and the equalizer unit 122 to perform the distortion compensation is sometimes called indirect learning.

The error calculation unit 125 calculates an error between the PD signal that is output from the equalizer unit 122 and the replica signal that is output from the frequency inverse characteristic identification unit 124. Because the PD signal has been subjected to the distortion compensation by the nonlinear distortion compensation unit 121 and the equalizer unit 122 and the replica signal has been subjected to the distortion compensation by the nonlinear inverse characteristic identification unit 123 and the frequency inverse characteristic identification unit 124, if the LUT and the tap coefficients are in an ideal state, the error calculated by the error calculation unit 125 becomes zero.

The coefficient setting unit 126 sets the distortion compensation coefficients stored in the LUT in the nonlinear inverse characteristic identification unit 123 and sets the tap coefficients of the FIR filter included in the frequency inverse characteristic identification unit 124. At this time, the coefficient setting unit 126 updates the distortion compensation coefficients and the tap coefficients by using, for example, the LMS algorithm such that the error calculated by the error calculation unit 125 is close to zero. When the tap coefficients are updated, the coefficient setting unit 126 calculates a plurality of tap coefficients under the limitation in which the sum of the tap coefficients in the frequency inverse characteristic identification unit 124 is set to 1.

The DA converter 130 performs DA conversion on the PD signal that is output from the processor 120 and outputs the obtained analog signal to the up converter 150.

The local oscillator 140 generates a local frequency for up-conversion and down-conversion.

The up converter 150 performs up-conversion on an analog signal that is output form the DA converter 130 and then outputs the obtained radio signal to the electric power amplifier 160.

The electric power amplifier 160 amplifies the radio signal output from the up converter 150 and performs radio transmission via the antenna. The electric power amplifier 160 generates linear distortion and nonlinear distortion when the radio signal is amplified. In the embodiment, because distortion of the inverse characteristic of the linear distortion is added to the BB signal by the equalizer unit 122 and distortion of the inverse characteristic of the nonlinear distortion is added to the BB signal by the nonlinear distortion compensation unit 121, the linear distortion and the nonlinear distortion generated in the electric power amplifier 160 are canceled out.

The down converter 170 feeds back the radio signal that is output from the electric power amplifier 160, performs down-conversion on the radio signal, and then outputs the obtained baseband FB signal to the AD converter 180.

The AD converter 180 performs AD conversion on the FB signal that is output from the down converter 170 and then outputs the obtained digital FB signal to the processor 120.

In the following, a specific example of an amplifier inverse characteristic identification unit according to the first embodiment will be described with reference to FIG. 3. The amplifier inverse characteristic identification unit according to the first embodiment is constituted by including the nonlinear inverse characteristic identification unit 123 and the frequency inverse characteristic identification unit 124.

Figure 3:
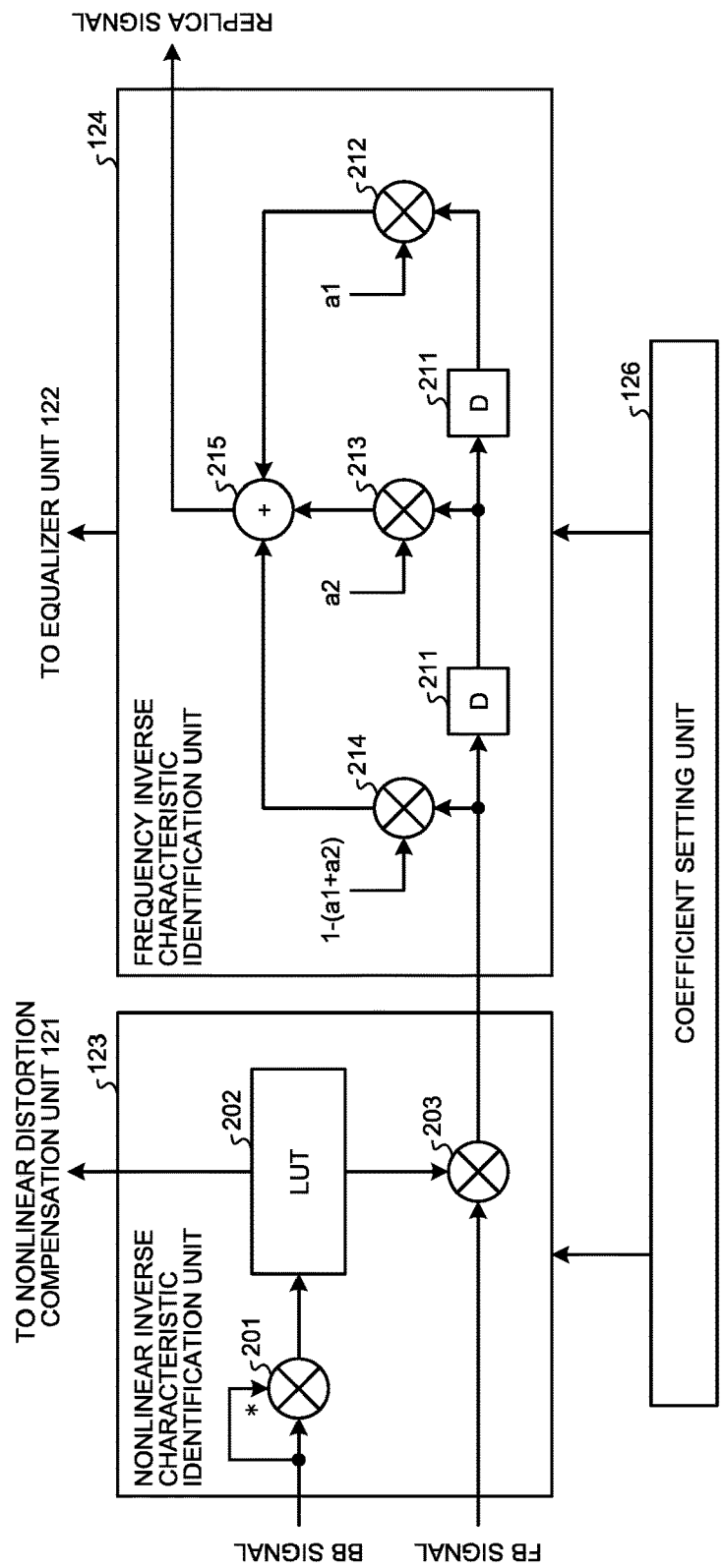
FIG. 3 is a block diagram illustrating a specific example of an amplifier inverse characteristic identification unit.

As illustrated in FIG. 3, the nonlinear inverse characteristic identification unit 123 includes an electric power calculation unit 201, a LUT 202, and a multiplier 203. Furthermore, in the embodiment, the nonlinear distortion compensation unit 121 also has the same configuration as that of the nonlinear inverse characteristic identification unit 123.

The electric power calculation unit 201 calculates electric power of the BB signal. The LUT 202 stores therein the distortion compensation coefficients in association with the electric power of the signal and outputs, if electric power of the BB signal is output from the electric power calculation unit 201, the distortion compensation coefficient that is associated with the electric power to the multiplier 203. The distortion compensation coefficients stored in the LUT 202 are updated by the coefficient setting unit 126 such that the error calculated by the error calculation unit 125 is decreased.

Specifically, the distortion compensation coefficient that is output to the multiplier 203 is updated by using, for example, Equation (4) below.

$$h_{addr}(n+1) = h_{addr}(n) + e(n) y^*_n \qquad (4)$$

In Equation (4), $h_{addr}(n)$ denotes a distortion compensation coefficient that is before an update and $h_{addr}(n+1)$ denotes a distortion compensation coefficient that is after the update. Furthermore, denotes a predetermined coefficient, $e(n)$ denotes an error that is calculated by the error calculation unit 125, and $y^*_n$ denotes the complex conjugate of a FB signal $y_n$. In this way, a new distortion compensation coefficient $h_{addr}(n+1)$ is calculated based on the distortion compensation coefficient $h_{addr}(n)$ that is output from the LUT 202 at a timing n and based on the associated error $e(n)$ and an FB signal $y_n$. The distortion compensation coefficient $h_{addr}(n+1)$ is stored in the LUT 202 instead of the distortion compensation coefficient $h_{addr}(n)$.

By using the update process performed on the LUT 202 described above, the nonlinear inverse characteristic identification unit 123 identifies the nonlinear inverse characteristic of the electric power amplifier 160. Furthermore, the LUT 202 is periodically duplicated to the nonlinear distortion compensation unit 121.

The multiplier 203 multiplies the distortion compensation coefficient that is output from the LUT 202 by the FB signal and performs nonlinear distortion compensation on the FB signal. The FB signal that has been subjected to the nonlinear distortion compensation is output to the frequency inverse characteristic identification unit 124.

As illustrated in FIG. 3, the frequency inverse characteristic identification unit 124 includes a plurality of delay devices 211, multipliers 212 to 214, and an adder 215. Furthermore, in the embodiment, the equalizer unit 122 also has the same configuration as that of the frequency inverse characteristic identification unit 124.

Each of the delay devices 211 outputs, after having held a sample of each of the signals, the held samples to the delay device 211 or the multiplier 212 that are placed downstream the delay device 211 has output the held samples. Thus, when the latest sample of the FB signal is input to the frequency inverse characteristic identification unit 124 illustrated in FIG. 3, a past sample obtained at a 1-sample timing and a past sample obtained at a 2-sample timing are output from each of the delay devices 211.

The multiplier 212 multiplies a tap coefficient a1 by the past sample obtained at the 2-sample timing.

The multiplier 213 multiplies a tap coefficient a2 by the past sample obtained at the 1-sample timing.

The multiplier 214 multiplies a tap coefficient 1−(a1+a2) by the latest sample. Namely, the multiplier 214 multiplies the tap coefficient that has been adjusted such that the sum of the three tap coefficients becomes 1 by the latest sample of the FB signal.

The tap coefficients that are multiplied by the samples by the multipliers 212 to 214 are updated by the coefficient setting unit 126 such that the error calculated by the error calculation unit 125 is decreased. Namely, the tap coefficient a1 and the tap coefficient a2 are updated such that the error is decreased under the limitation in which the sum of the three tap coefficients is set to 1.

Specifically, in a case where, for example, the LMS algorithm is used, the tap coefficients a1 and a2 are updated by using Equations (5) and (6) below.

$$a1(n+1)=a1(n)+e(n)(y^*_{n-1}-y^*_{n+1}) \quad (5)$$

$$a2(n+1)=a2(n)+e(n)(y^*_n-y^*_{n+1}) \quad (6)$$

In Equations (5) and (6), a1(n) and a2(n) denote tap coefficients that are before the update and a1(n+1) and a2(n+1) denote tap coefficients that are after the update. Furthermore, denotes a predetermined coefficient, e(n) denotes an error that is calculated by the error calculation unit 125, and $y^*_n$ denotes the complex conjugate of the FB signal $y_n$. In this way, new tap coefficients a1(n+1) and a2(n+1) are calculated from the tap coefficients a1(n) and a2(n) that were used at a timing n, from the associated error e(n), and from the FB signals $y_{n-1}$, $y_n$, and $y_{n+1}$ each of which includes one of the samples obtained between the previous and the subsequent timings. Then, the remaining single tap coefficient is calculated by subtracting the sum of these tap coefficients a1(n+1) and a2(n+1) from 1. These tap coefficients are set in each of the multipliers 212 to 214.

By using the update process performed on the tap coefficients described above, the frequency inverse characteristic identification unit 124 identifies the frequency inverse characteristic of the electric power amplifier 160. Furthermore, the tap coefficients are periodically duplicated to the equalizer unit 122.

Figure 4:
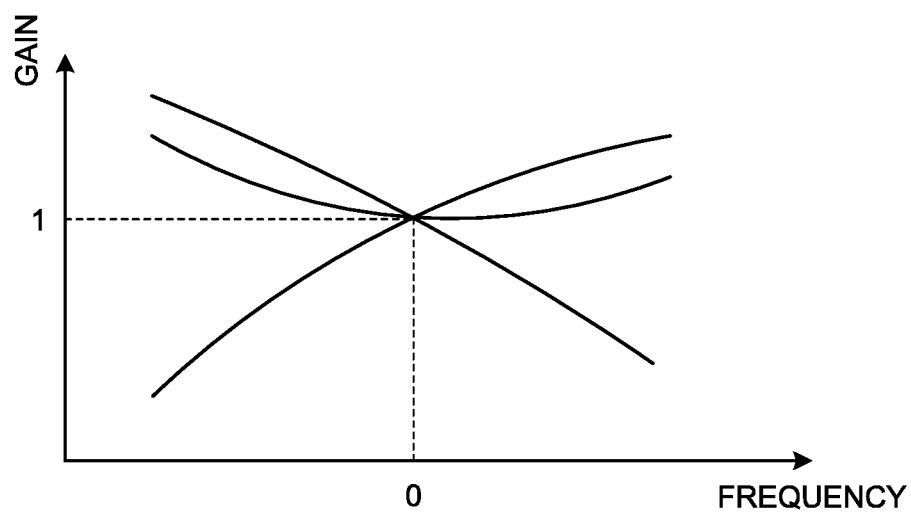
FIG. 4 is a diagram illustrating a specific example of a frequency characteristic of a frequency inverse characteristic identification unit.
Figure 4:
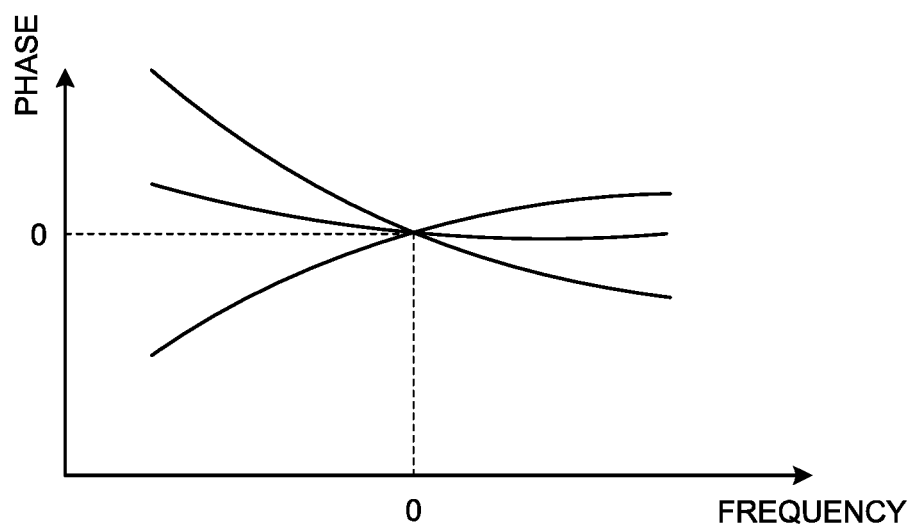

Here, by imposing the limitation in which the sum of the tap coefficients is set to 1, the frequency characteristic of the frequency inverse characteristic identification unit 124 exhibits the gain characteristic and the phase characteristic illustrated in, for example, FIG. 4. The diagram illustrated in the upper part of FIG. 4 is a diagram illustrating an example of the gain characteristic of the frequency inverse characteristic identification unit 124. As illustrated in this diagram, the gain at the center frequency is fixed to 1 regardless of the type of the frequency inverse characteristic identification unit 124. Similarly, the diagram illustrated in the lower part of FIG. 4 is a diagram illustrating an example of the phase characteristic of the frequency inverse characteristic identification unit 124. As illustrated in this diagram, the phase at the center frequency is fixed to zero regardless of the type of the frequency inverse characteristic identification unit 124.

In this way, by imposing the limitation in which the sum of the tap coefficients is set to 1, the frequency characteristic of the frequency inverse characteristic identification unit 124 passes through a fixed point and it is thus possible to uniquely decide the tap coefficients of the multipliers 212 to 214 and the distortion compensation coefficients in the LUT 202. As a result, even if the coefficients related to linear distortion and nonlinear distortion are separately calculated, it is possible to perform stable distortion compensation. Furthermore, by imposing the limitation to the tap coefficients in the frequency inverse characteristic identification unit 124, for example, the flexibility of adjusting the gain is decreased; however, fluctuations in the gain that is unable to be adjusted by the frequency inverse characteristic identification unit 124 is reflected to an update of the distortion compensation coefficients in the nonlinear inverse characteristic identification unit 123.

A description will be given here by referring back to FIG. 3. The adder 215 performs linear distortion compensation on the FB signal by summing the multiplication results obtained by the multipliers 212 to 214 and then generates a replica signal associated with a PD signal. If the LUTs included in the nonlinear distortion compensation unit 121 and the nonlinear inverse characteristic identification unit 123 and the tap coefficients of the equalizer unit 122 and the frequency inverse characteristic identification unit 124 are in an ideal state, the replica signal generated by the adder 215 and the PD signal output from the equalizer unit 122 are equal.

Figure 5:
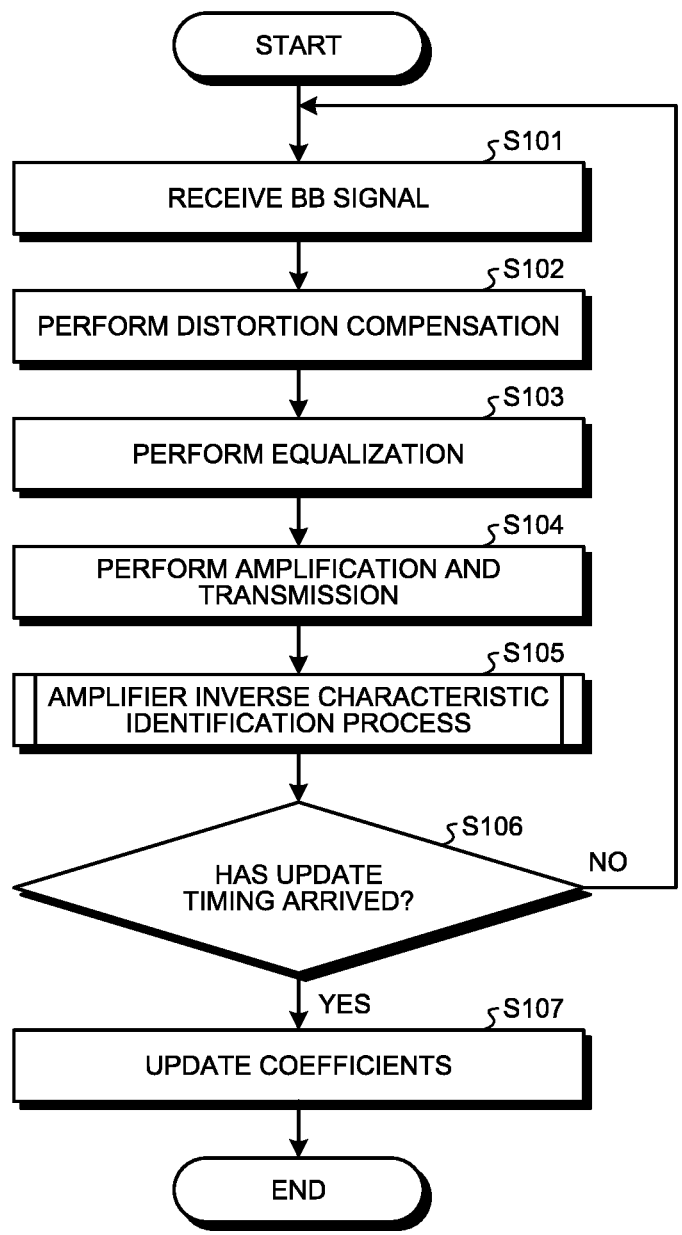
FIG. 5 is a flowchart illustrating an update process according to the first embodiment.

In the following, the update process performed on the coefficients in the radio communication device 100 having the configuration described above will be described with reference to the flowchart illustrated in FIG. 5.

The BB signal that is addressed to the terminal device and that is transmitted from the baseband device 10 is received by the wired I/F unit 110 in the radio communication device 100 (Step S101). The BB signal is input to the nonlinear distortion compensation unit 121 in the processor 120 and the distortion compensation coefficient that has been read from the LUT included in the nonlinear distortion compensation unit 121 is multiplied by the BB signal, thereby nonlinear distortion compensation is performed on the BB signal (Step S102). The BB signal that has been subjected to the nonlinear distortion compensation is equalized by the equalizer unit 122 (Step S103). Namely, the samples of the BB signal are sequentially input to the equalizer unit 122, a tap coefficient is multiplied by each of the samples, and the multiplication results are added, thereby a PD signal is generated.

The PD signal is subjected to DA conversion by the DA converter 130 and then the obtained analog signal is subjected to up-conversion by the up converter 150. The radio signal output from the up converter 150 is amplified by the electric power amplifier 160 and is wirelessly transmitted via the antenna (Step S104). Furthermore, the transmission signal output from the electric power amplifier 160 is fed back to the down converter 170.

The fed back FB signal is subjected to down-conversion by the down converter 170 and is subjected to AD conversion by the AD converter 180. Then, the FB signal is input to the nonlinear inverse characteristic identification unit 123 in the processor 120 and then the amplifier inverse characteristic identification process is performed by the nonlinear inverse characteristic identification unit 123 and the frequency inverse characteristic identification unit 124 (Step S105). Namely, the distortion compensation coefficients stored in the LUT 202 in the nonlinear inverse characteristic identification unit 123 are updated and the tap coefficients of the frequency inverse characteristic identification unit 124 are updated, thereby the nonlinear inverse characteristic and the frequency inverse characteristic of the electric power amplifier 160 are identified. The amplifier inverse characteristic identification process will be described later.

When the amplifier inverse characteristic identification process is performed, it is determined, by the nonlinear inverse characteristic identification unit 123 and the frequency inverse characteristic identification unit 124, whether the update timing arrives to update both the tap coefficients and the LUTs included in the nonlinear distortion compensation unit 121 and the equalizer unit 122 (Step S106). The update timing periodically arrives and the nonlinear inverse characteristic identification unit 123 determines whether the update timing arrives to update the LUTs, whereas the frequency inverse characteristic identification unit 124 determines whether the update timing arrives to update the tap coefficients.

Based on the result of this determination, during the period of time for which the update timing has not arrived (No at Step S106), the amplifier inverse characteristic identification process is repeated while transmission of the signal is continuously performed. Then, when the update timing arrives (Yes at Step S106), the LUT 202 in the nonlinear inverse characteristic identification unit 123 is duplicated to the nonlinear distortion compensation unit 121, whereas the tap coefficients of the frequency inverse characteristic identification unit 124 are duplicated to the equalizer unit 122. Consequently, the distortion compensation coefficients stored in the LUT in the nonlinear distortion compensation unit 121 and the tap coefficients of the equalizer unit 122 are updated (Step S107). In this way, the amplifier inverse characteristic identification process is performed independently from distortion compensation to be performed on the transmission signal and, when the update timing arrives, indirect learning, in which the coefficients updated by the amplifier inverse characteristic identification process are duplicated to the coefficients stored in the nonlinear distortion compensation unit 121 and the equalizer unit 122, is performed.

Figure 6:
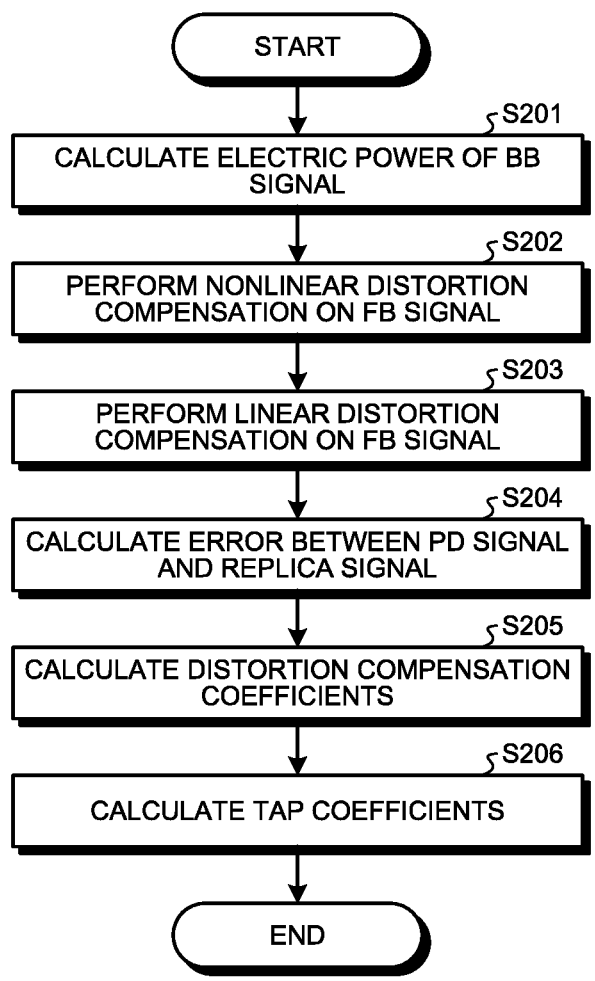
FIG. 6 is a flowchart illustrating an amplifier inverse characteristic identification process.

In the following, the amplifier inverse characteristic identification process will be described with reference to the flowchart illustrated in FIG. 6. The amplifier inverse characteristic identification process illustrated in FIG. 6 is a process of separately identifying the nonlinear inverse characteristic and the frequency inverse characteristic of the electric power amplifier 160.

If the BB signal is input to the nonlinear inverse characteristic identification unit 123, electric power of the BB signal is calculated by the electric power calculation unit 201 (Step S201). Then, the distortion compensation coefficient associated with the calculated electric power is output from the LUT 202 to the multiplier 203 and the distortion compensation coefficient is multiplied by the FB signal by the multiplier 203, thereby nonlinear distortion compensation is performed on the FB signal (Step S202).

The samples of the FB signal that have been subjected to the nonlinear distortion compensation are sequentially input to the frequency inverse characteristic identification unit 124. Then, a tap coefficient is multiplied by each of the samples that were obtained at the corresponding sample timings, while the samples are moving in the plurality of the delay devices 211. Namely, the tap coefficient is multiplied by each of the associated samples by the multipliers 212 to 214 and the multiplication results are added by the adder 215. Consequently, linear distortion compensation is performed on the FB signal (Step S203) and a replica signal associated with the PD signal is generated.

The generated replica signal is output to the error calculation unit 125 and then an error between the PD signal and the replica signal is calculated by the error calculation unit 125 (Step S204). The error is output to the coefficient setting unit 126 and then the distortion compensation coefficients that are used for the nonlinear distortion compensation in the nonlinear inverse characteristic identification unit 123 are calculated by the coefficient setting unit 126 (Step S205). Namely, the distortion compensation coefficients that allow the error to approach zero are calculated by using, for example, the LMS algorithm and are stored in the LUT 202. In this way, by repeatedly updating the distortion compensation coefficients stored in the LUT 202 in the nonlinear inverse characteristic identification unit 123, the nonlinear inverse characteristic of the electric power amplifier 160 is identified.

Furthermore, the tap coefficients that are used for linear distortion compensation in the frequency inverse characteristic identification unit 124 are calculated by the coefficient setting unit 126 (Step S206). Namely, the tap coefficients that allow the error to approach zero are calculated by using, for example, the LMS algorithm. At this time, each of the tap coefficients is calculated under the limitation in which the sum of the plurality of tap coefficients is set to 1. Thus, in a case where, for example, three tap coefficients are used in the frequency inverse characteristic identification unit 124, two tap coefficients are calculated by using, for example, the LMS algorithm and then the sum of these tap coefficients is subtracted from 1, thereby the remaining single tap coefficient is calculated. In this way, by repeatedly updating the tap coefficients in the frequency inverse characteristic identification unit 124, the frequency inverse characteristic of the electric power amplifier 160 is identified.

As described above, according to the embodiment, when the nonlinear inverse characteristic of the electric power amplifier is identified by updating the LUT and when the frequency inverse characteristic of the electric power amplifier is identified by updating the tap coefficients, indirect learning is performed in which the limitation in which the sum of the tap coefficients is set to 1 is imposed and the updated LUT and the updated tap coefficients are periodically duplicated to the nonlinear distortion compensation unit and the equalizer unit. Consequently, it is possible to uniquely decide the distortion compensation coefficients stored in the LUT and the tap coefficients that are used for equalization and perform stable distortion compensation even if the coefficients related to the linear distortion and the nonlinear distortion are separately calculated.

[b] Second Embodiment

The characteristic of a second embodiment is to use the direct learning in which the LUT and the tap coefficients used for distortion compensation are directly updated.

The radio communication system according to the second embodiment is the same as that described in the first embodiment (FIG. 1); therefore, descriptions thereof will be omitted.

Figure 7:
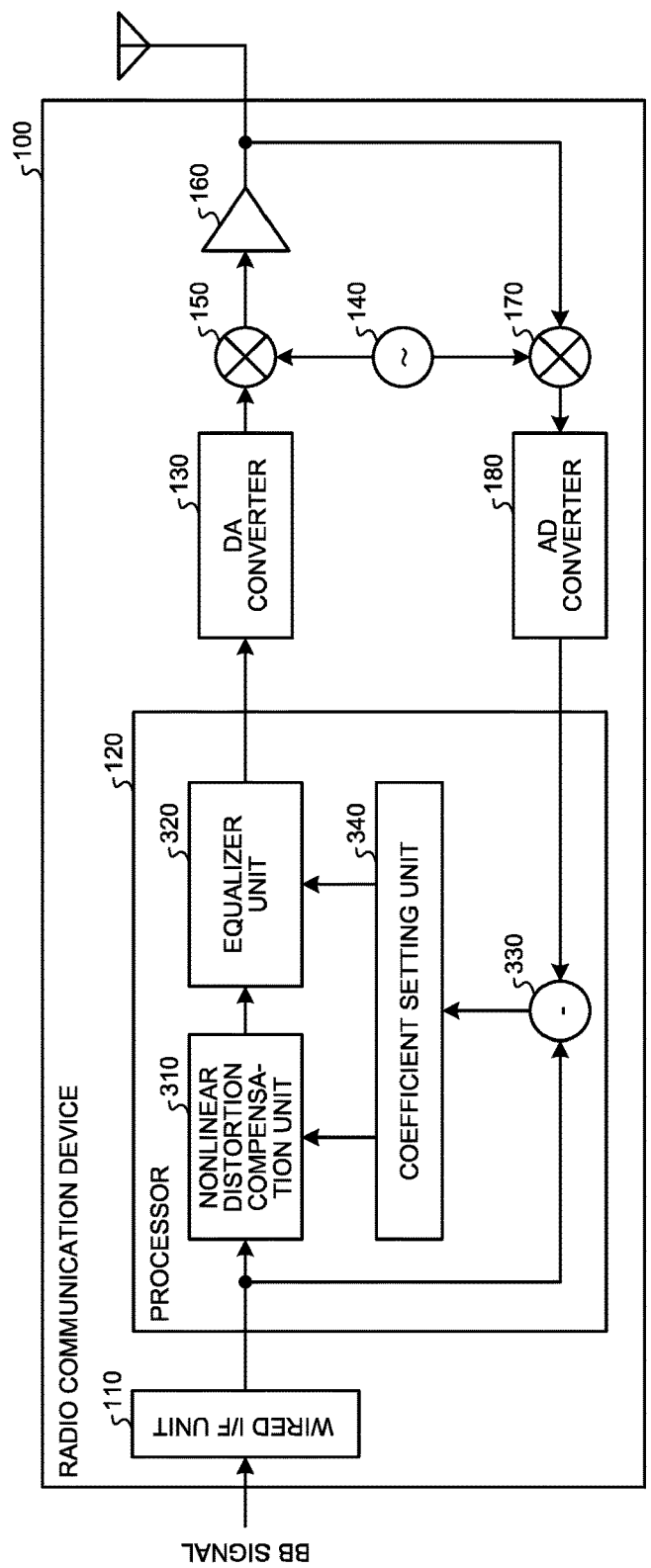
FIG. 7 is a block diagram illustrating a configuration of a radio communication device according to a second embodiment.

FIG. 7 is a block diagram illustrating the configuration of the radio communication device 100 according to the second embodiment. In FIG. 7, components that are the same as those illustrated in FIG. 2 are assigned the same reference numerals and descriptions thereof will be omitted. In the radio communication device 100 illustrated in FIG. 7, the internal configuration of the processor 120 is different from that included in the radio communication device 100 illustrated in FIG. 2. Namely, the processor 120 according to the second embodiment includes a nonlinear distortion compensation unit 310, an equalizer unit 320, an error calculation unit 330, and a coefficient setting unit 340.

The nonlinear distortion compensation unit 310 compensates nonlinear distortion generated in the electric power amplifier 160. Specifically, the nonlinear distortion compensation unit 310 includes an LUT that stores therein, in association with electric power of a signal, distortion compensation coefficients; reads, if a BB signal is input, the distortion compensation coefficients associated with the electric power of the BB signal from the LUT; and multiplies each of the distortion compensation coefficients by the BB signal. The LUT included in the nonlinear distortion compensation unit 310 is update any time by the coefficient setting unit 340, which will be described later.

The equalizer unit 320 compensates linear distortion generated in the electric power amplifier 160. Specifically, the equalizer unit 320 includes an FIR filter that multiplies each of the tap coefficients by the plurality of temporally continuous signal samples; obtains the sum thereof; and equalizes the BB signal. The tap coefficients of the equalizer unit 320 are updated any time by the coefficient setting unit 340, which will be described later.

The nonlinear distortion compensation unit 310 and the equalizer unit 320 perform distortion compensation on the BB signal by using the PD technique. Namely, the nonlinear distortion compensation unit 310 and the equalizer unit 320 compensate the linear distortion and the nonlinear distortion generated in the electric power amplifier 160 and then the PD signal that has been subjected to the distortion compensation is output from the equalizer unit 320.

The error calculation unit 330 calculates an error between the BB signal that has not been subjected to the distortion compensation and the FB signal that is fed back from the electric power amplifier 160. After the FB signal has been subjected to the distortion compensation by the nonlinear distortion compensation unit 310 and the equalizer unit 320, the FB signal is amplified by the electric power amplifier 160; therefore, if the LUT and the tap coefficients are in an ideal state, the error calculated by the error calculation unit 330 becomes zero.

The coefficient setting unit 340 sets the distortion compensation coefficients stored in the LUT in the nonlinear distortion compensation unit 310 and the tap coefficient of the FIR filter in the equalizer unit 320. At this time, the coefficient setting unit 340 updates the distortion compensation coefficients and the tap coefficients by using, for example, the LMS algorithm such that the error calculated by the error calculation unit 330 approaches zero. When updating the tap coefficients, the coefficient setting unit 340 calculates a plurality of tap coefficients under the limitation in which the sum of the tap coefficients of the equalizer unit 320 is set to 1. In this way, the technique in which the coefficients that are used for distortion compensation by the nonlinear distortion compensation unit 310 and the equalizer unit 320 is sometimes called direct learning.

In the following, a specific example of an amplifier inverse characteristic identification unit according to the second embodiment will be described with reference to FIG. 8. The amplifier inverse characteristic identification unit according to the second embodiment is constituted by including the nonlinear distortion compensation unit 310 and the equalizer unit 320.

Figure 8:
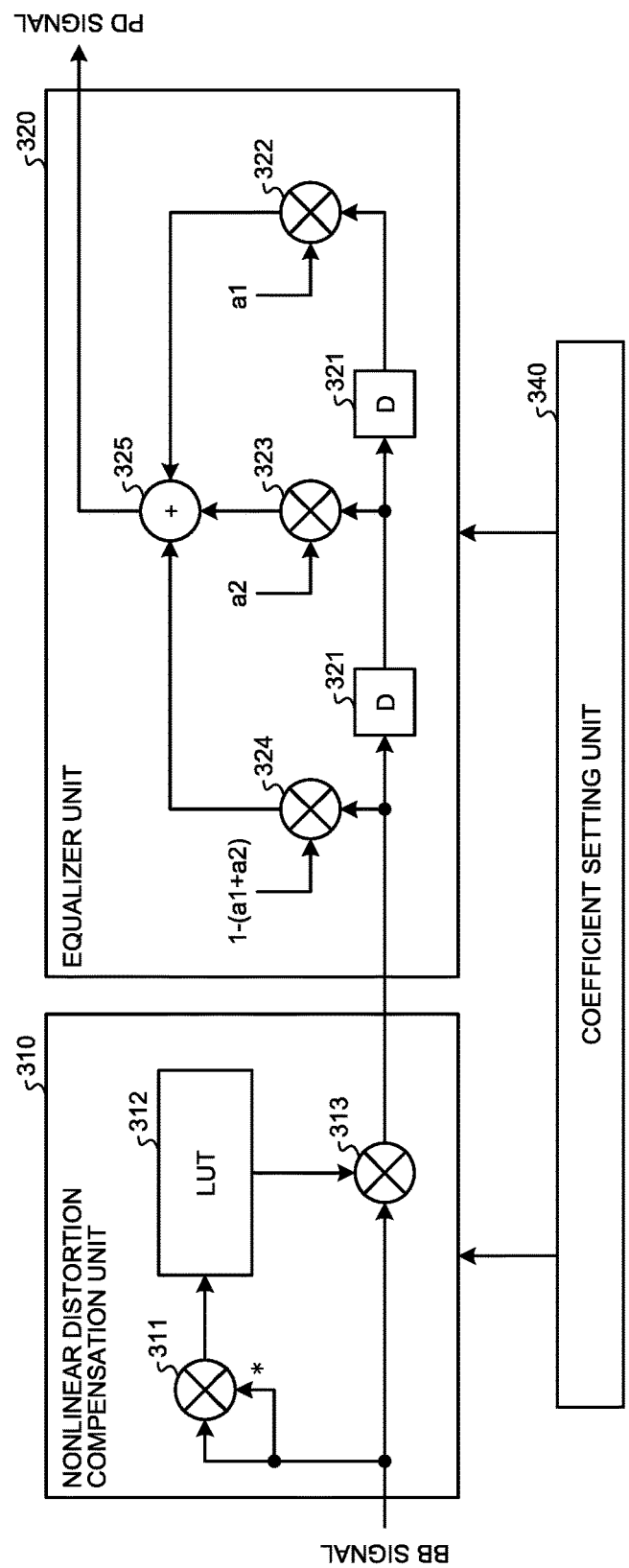
FIG. 8 is a block diagram illustrating a specific example of an amplifier inverse characteristic identification unit.

As illustrated in FIG. 8, the nonlinear distortion compensation unit 310 includes an electric power calculation unit 311, a LUT 312, and a multiplier 313.

The electric power calculation unit 311 calculates electric power of the BB signal. The LUT 312 stores therein, in association with the electric power of the signal, distortion compensation coefficients and outputs, if the electric power of the BB signal is output from the electric power calculation unit 311, the distortion compensation coefficients associated with this electric power to the multiplier 313. The distortion compensation coefficients stored in the LUT 312 are updated by the coefficient setting unit 340 such that the error calculated by the error calculation unit 330 is decreased.

Specifically, the distortion compensation coefficients that are output to the multiplier 313 are updated by using, for example, Equation (7) below.

$$h_{addr}(n+1) = h_{addr}(n) + e(n)x^*_n \quad (7)$$

In Equation (7), $h_{addr}(n)$ denotes a distortion compensation coefficient that is before the update and $h_{addr}(n+1)$ denotes a distortion compensation coefficient that is after the update. Furthermore, is a predetermined coefficient, e(n) denotes an error that is calculated by the error calculation unit 330, and $x^*_n$ denotes the complex conjugate of a BB signal $x_n$. In this way, a new distortion compensation coefficient $h_{addr}(n+1)$ is calculated based on the distortion compensation coefficient $h_{addr}(n)$ that is output from the LUT 312 at the timing n and based on the associated error e(n) and the BB signal $x_n$. The distortion compensation coefficient $h_{addr}(n+1)$ is stored in the LUT 312 instead of the distortion compensation coefficient $h_{addr}(n)$.

By using the update process performed on the LUT 312, the nonlinear distortion compensation unit 310 identifies the nonlinear inverse characteristic of the electric power amplifier 160.

The multiplier 313 multiplies the distortion compensation coefficient that is output from the LUT 312 by the BB signal and performs nonlinear distortion compensation on the BB signal. The BB signal that has been subjected to the nonlinear distortion compensation is output to the equalizer unit 320.

As illustrated in FIG. 8, the equalizer unit 320 includes a plurality of delay devices 321, multipliers 322 to 324, and an adder 325.

Each of the delay devices 321 outputs, after having held a sample of each of the signals, the held samples to the delay device 321 or the multiplier 322 that are placed in downstream thereof. Thus, when the latest sample of the BB signal is input to the equalizer unit 320 illustrated in FIG. 8, each of a past sample obtained at a 1-sample timing and a past sample obtained at a 2-sample timing is output from each of the delay devices 321.

The multiplier 322 multiplies the tap coefficient a1 by the past sample obtained at the 2-sample timing.

The multiplier 323 multiplies the tap coefficient a2 by the past sample obtained at the 1-sample timing.

The multiplier 324 multiplies the tap coefficient 1−(a1+a2) by the latest sample. Namely, the multiplier 324 multiplies the tap coefficient that has been adjusted such that the sum of the three tap coefficients becomes 1 by the latest sample of the BB signal.

The tap coefficients that are multiplied by the samples by the multipliers 322 to 324 are updated by the coefficient setting unit 340 such that the error calculated by the error calculation unit 330 is decreased. Namely, the tap coefficient a1 and the tap coefficient a2 are updated such that the error is decreased under the limitation in which the sum of the three tap coefficients is set to 1.

Specifically, the tap coefficients a1 and a2 are updated by using, for example, Equations (8) and (9) below.

$$a1(n+1) = a1(n) + e(n)(x^*_{n-1} - x^*_{n+1}) \quad (8)$$

$$a2(n+1) = a2(n) + e(n)(x^*_n - x^*_{n+1}) \quad (9)$$

In Equations (8) and (9), a1(n) and a2(n) denote tap coefficients that are before the update and a1(n+1) and a2(n+1) are tap coefficients that are after the update. Furthermore, denotes a predetermined coefficient, e(n) denotes an error that is calculated by the error calculation unit 330, and $x^*_n$ denotes the complex conjugate of the BB signal $x_n$. In this way, new tap coefficients a1(n+1) and a2(n+1) are calculated from the tap coefficients a1(n) and a2(n) that were used at the timing n, from the associated error e(n), and from the BB signals $x_{n-1}$, $x_n$, and $x_{n+1}$ each of which includes the samples obtained between the previous and the subsequent timings. Then, the remaining single tap coefficient is calculated by subtracting the sum of these tap coefficients a1(n+1) and a2(n+1) from 1. These tap coefficients are set in each of the multipliers 322 to 324.

The equalizer unit 320 identifies the frequency inverse characteristic of the electric power amplifier 160 by using the update process performed on the tap coefficients described above.

The adder 325 performs linear distortion compensation on the BB signal by summing the multiplication results obtained by the multipliers 322 to 324 and then generates a PD signal.

Figure 9:
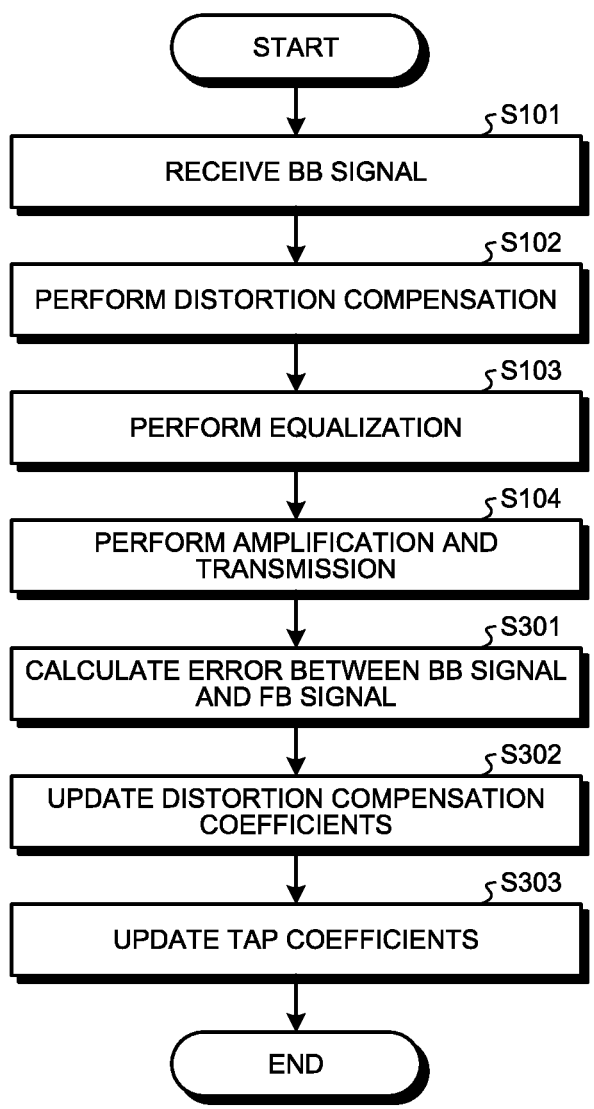
FIG. 9 is a flowchart illustrating an update process according to the second embodiment.

In the following, the update process performed on the coefficients in the radio communication device 100 having the configuration described above will be described with reference to the flowchart illustrated in FIG. 9. In FIG. 9, the processes that are the same as those illustrated in FIG. 5 are assigned the same reference numerals.

The BB signal that is addressed to the terminal device and that is transmitted from the baseband device 10 is received by the wired I/F unit 110 in the radio communication device 100 (Step S101). The BB signal is input to the nonlinear distortion compensation unit 310 in the processor 120 and each of the distortion compensation coefficients that have been read from the LUT 312 included in the nonlinear distortion compensation unit 310 is multiplied by the BB signal, thereby nonlinear distortion compensation is performed on the BB signal (Step S102). The BB signal that has been subjected to the nonlinear distortion compensation is equalized by the equalizer unit 320 (Step S103). Namely, the samples of the BB signal are sequentially input to the equalizer unit 320, a tap coefficient is multiplied by each of the samples, and the multiplication results are added, thereby a PD signal is generated.

The PD signal is subjected to DA conversion by the DA converter 130 and then the obtained analog signal is subjected to up-conversion by the up converter 150. The radio signal output from the up converter 150 is amplified by the electric power amplifier 160 and is wirelessly transmitted via the antenna (Step S104). Furthermore, the transmission signal output from the electric power amplifier 160 is fed back to the down converter 170.

The fed back FB signal is subjected to down-conversion by the down converter 170 and then subjected to AD conversion by the AD converter 180. Then, the FB signal is input to the error calculation unit 330 in the processor 120 and then an error between the BB signal and the FB signal that has not been subjected to the distortion compensation is calculated by the error calculation unit 330 (Step S301). This error is output to the coefficient setting unit 340 and then the distortion compensation coefficients that were used for the nonlinear distortion compensation in the nonlinear distortion compensation unit 310 are updated by the coefficient setting unit 340 (Step S302). Namely, the distortion compensation coefficients that allow the error to approach zero is calculated by using, for example, the LMS algorithm and are stored in the LUT 312. In this way, by repeatedly updating the distortion compensation coefficients stored in the LUT 312 included in the nonlinear distortion compensation unit 310, the nonlinear inverse characteristic of the electric power amplifier 160 is identified.

Furthermore, the tap coefficients that were used for the linear distortion compensation in the equalizer unit 320 are updated by the coefficient setting unit 340 (Step S303). Namely, the tap coefficients that allow the error to approach zero is calculated by using, for example, the LMS algorithm. At this time, each of the tap coefficients is calculated under the limitation in which the each of the plurality of tap coefficients is set to 1. Thus, in a case where, for example, three tap coefficients are used in the equalizer unit 320, two tap coefficients are calculated by using, for example, the LMS algorithm and then the sum of these tap coefficients is subtracted from 1, thereby the remaining single tap coefficient is calculated. In this way, by repeatedly updating the tap coefficients in the equalizer unit 320, the frequency inverse characteristic of the electric power amplifier 160 is identified.

As described above, according to the embodiment, the nonlinear inverse characteristic of the electric power amplifier is identified by updating the LUT that is used for nonlinear distortion compensation of the transmission signal and, when the frequency inverse characteristic of the electric power amplifier is identified by updating the tap coefficients that are used for the linear distortion compensation of the transmission signal, the limitation in which the sum of the tap coefficients is set to 1 is imposed. Then, direct learning is performed in which the updated LUT and the tap coefficients are used for the nonlinear distortion compensation and the linear distortion compensation at real time. Consequently, it is possible to uniquely decide the distortion compensation coefficients stored in the LUT and the tap coefficients that are used for equalization and perform stable distortion compensation even if the coefficients related to the linear distortion and the nonlinear distortion are separately calculated.

[c] Third Embodiment

The characteristic of a third embodiment is that a series is used for nonlinear distortion compensation and limitation is imposed when the coefficients included in the series are updated.

The radio communication system according to the third embodiment is the same as that described in the first embodiment (FIG. 1); therefore, descriptions thereof will be omitted.

Figure 10:
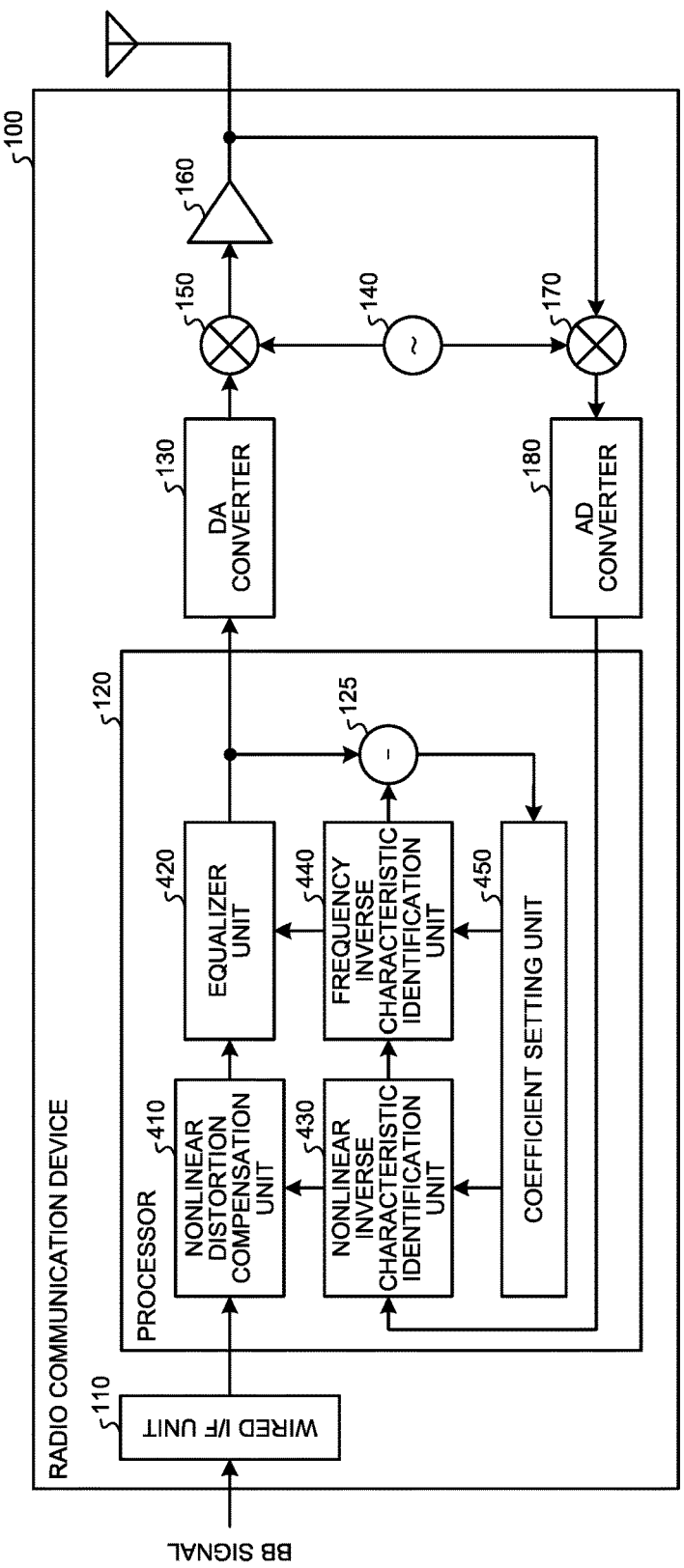
FIG. 10 is a block diagram illustrating a configuration of a radio communication device according to a third embodiment.

FIG. 10 is a block diagram illustrating the configuration of the radio communication device 100 according to the third embodiment. In FIG. 10, components that are the same as those illustrated in FIG. 2 are assigned the same reference numerals and descriptions thereof will be omitted. In the radio communication device 100 illustrated in FIG. 10, the internal configuration of the processor 120 is different from that included in the radio communication device 100 illustrated in FIG. 2. Namely, the processor 120 according to the third embodiment includes a nonlinear distortion compensation unit 410, an equalizer unit 420, a nonlinear inverse characteristic identification unit 430, a frequency inverse characteristic identification unit 440, the error calculation unit 125, and a coefficient setting unit 450.

The nonlinear distortion compensation unit 410 compensates the nonlinear distortion generated in the electric power amplifier 160. Specifically, the nonlinear distortion compensation unit 410 performs arithmetic calculation on the series that includes a plurality of coefficients by using the BB signal. The coefficients in the series used for the arithmetic calculation by the nonlinear distortion compensation unit 410 are periodically replaced with the coefficients in the series used for the arithmetic calculation by the nonlinear inverse characteristic identification unit 430, which will be described later.

The equalizer unit 420 compensates the linear distortion generated in the electric power amplifier 160. Specifically, the equalizer unit 420 includes an FIR filter that multiplies each of the tap coefficients by the plurality of temporally continuous signal samples, that obtains the sum thereof, and that equalizes the BB signal. The tap coefficients in the equalizer unit 420 are periodically replaced with the tap coefficients that are subjected to the update process in the frequency inverse characteristic identification unit 440, which will be described later.

The nonlinear distortion compensation unit 410 and the equalizer unit 420 perform distortion compensation on the BB signal by using the PD technique. Namely, the nonlinear distortion compensation unit 410 and the equalizer unit 420 compensates the linear distortion and the nonlinear distortion generated in the electric power amplifier 160 and the PD signal that has been subjected to the distortion compensation is output from the equalizer unit 420.

The nonlinear inverse characteristic identification unit 430 identifies the nonlinear inverse characteristic of the electric power amplifier 160. Specifically, similarly to the nonlinear distortion compensation unit 410, the nonlinear inverse characteristic identification unit 430 can perform arithmetic calculation on a series and updates the coefficients included in the series such that the error calculated by the error calculation unit 125 is decreased. Furthermore, the nonlinear inverse characteristic identification unit 430 performs arithmetic calculation on the series that uses the FB signal that is fed back from the electric power amplifier 160 and performs nonlinear distortion compensation on the FB signal. Namely, the nonlinear inverse characteristic identification unit 430 performs the update process on the coefficients included in the series while performing the nonlinear distortion compensation, which is the same as that performed by the nonlinear distortion compensation unit 410, on the FB signal. Then, the nonlinear inverse characteristic identification unit 430 periodically duplicates the coefficients that are included in the series and are subjected to arithmetic calculation by itself to the nonlinear distortion compensation unit 410.

The coefficients included in the series in the nonlinear inverse characteristic identification unit 430 are set by the coefficient setting unit 450; however, each of the coefficients is not set without limitation but is set under certain limitation. Namely, the update process is performed on the coefficients under the limitation in which the coefficients of the term with a degree of 1 in the series are set to 1.

The frequency inverse characteristic identification unit 440 identifies the frequency inverse characteristic of the electric power amplifier 160. Specifically, similarly to the equalizer unit 420, the frequency inverse characteristic identification unit 440 includes the FIR filter and updates the tap coefficients of the FIR filter such that the error calculated by the error calculation unit 125 is the minimum. Furthermore, the frequency inverse characteristic identification unit 440 performs linear distortion compensation on the FB signal by equalizing the FB signal output from the nonlinear inverse characteristic identification unit 430. Namely, the frequency inverse characteristic identification unit 440 performs the update process on the tap coefficients while performing, on the FB signal, the linear distortion compensation that is the same as that performed by the equalizer unit 420. Then, the frequency inverse characteristic identification unit 440 periodically duplicates the tap coefficients of the FIR filter that is included in the own unit to the equalizer unit 420.

The nonlinear inverse characteristic identification unit 430 and the frequency inverse characteristic identification unit 440 identify the frequency inverse characteristic and the nonlinear inverse characteristic of the electric power amplifier 160 while performing distortion compensation on the FB signal by using the PD technique. Namely, the nonlinear inverse characteristic identification unit 430 and the frequency inverse characteristic identification unit 440 performs, on the FB signal, the distortion compensation that is the same as that performed by the nonlinear distortion compensation unit 410 and the equalizer unit 420 and then the replica signal associated with the PD signal is output from the frequency inverse characteristic identification unit 440.

The coefficient setting unit 450 sets the coefficients included in the series of the nonlinear inverse characteristic identification unit 430 and the tap coefficients of the FIR filter in the frequency inverse characteristic identification unit 440. At this time, the coefficient setting unit 450 updates the series coefficients and the tap coefficients by using, for example, the LMS algorithm such that the error calculated by the error calculation unit 125 approaches zero. When updating the series coefficients, the coefficient setting unit 450 calculates a plurality of coefficients under the limitation in which the coefficients of the term with a degree of 1 in the series are set to 1.

In the following, a specific example of an amplifier inverse characteristic identification unit according to the third embodiment will be described with reference to FIG. 11. The amplifier inverse characteristic identification unit according to the third embodiment is constituted by including the nonlinear inverse characteristic identification unit 430 and the frequency inverse characteristic identification unit 440.

Figure 11:
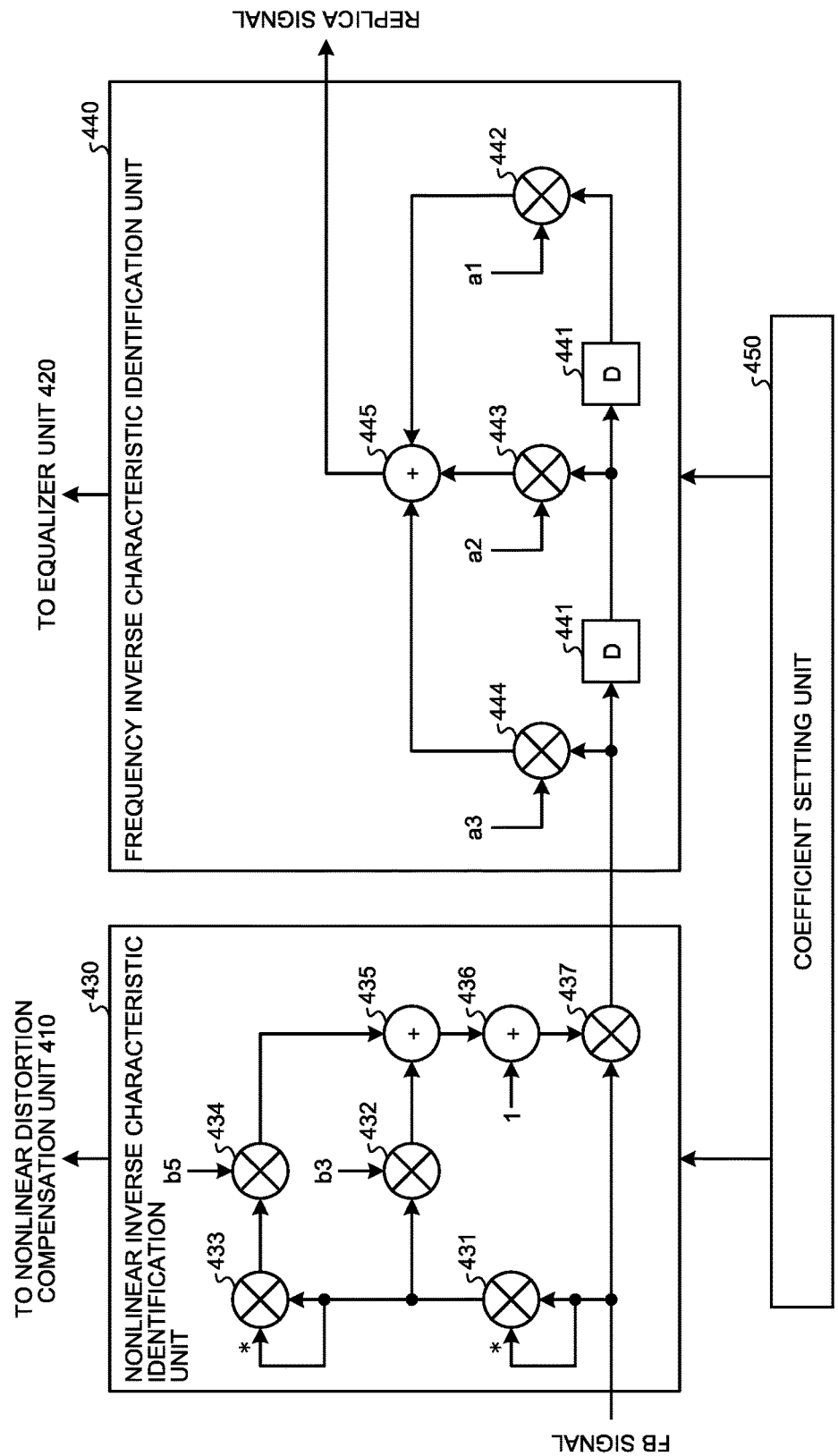
FIG. 11 is a block diagram illustrating a specific example of an amplifier inverse characteristic identification unit.

As illustrated in FIG. 11, the nonlinear inverse characteristic identification unit 430 includes multipliers 431 to 434 and 437 and adders 435 and 436. Furthermore, in the embodiment, the nonlinear distortion compensation unit 410 also has the same configuration at that of the nonlinear inverse characteristic identification unit 430.

The multiplier 431 squares the FB signal in order to generate the term with a degree of 3 in a series. The multiplier 432 multiplies a coefficient b3 of the term with a degree of 3 by an output of the multiplier 431.

The multiplier 433 squares the output of the multiplier 431 in order to generate the term with a degree of 5 in the series. The multiplier 434 multiplies a coefficient b5 of the term with a degree of 5 by an output of the multiplier 433.

The adder 435 adds, by adding the outputs of the multipliers 432 and 434, the term with the degree of 3 to the term with the degree of 5. The adder 436 adds 1 that is the coefficient of the term with the degree of 1 to the output of the adder 435.

The multiplier 437 multiplies the output of the adder 436 by the FB signal. The output of the multiplier 437 is the FB signal that has been subjected to nonlinear distortion compensation performed by arithmetic calculation using a series of degree 5.

The coefficients included in the series are updated by the coefficient setting unit 450 such that the error calculated by the error calculation unit 125 is decreased. Namely, the coefficients b3 and b5 are updated such that the error is decreased under the limitation in which the coefficients of the term with the degree of 1 are set to 1.

Specifically, in a case where, for example, the LMS algorithm is used, the coefficients b3 and b5 are updated by using Equations (10) and (11).

$$b3(n+1)=b3(n)+e(n)|y_n|^2 y^*_n \quad (10)$$

$$b5(n+1)=b5(n)+e(n)|y_n|^4 y^*_n \quad (11)$$

In Equations (10) and (11), b3(n) and b5(n) denote coefficients that are before the update, and b3(n+1) and b5(n+1) are coefficients that are after the update. Furthermore, denotes a predetermined coefficient, e(n) denotes an error calculated by the error calculation unit 125, and $y^*_n$ denotes the complex conjugate of the FB signal $y_n$. In this way, new coefficients b3(n+1) b5(n+1) are calculated from the coefficients b3(n) and b5(n) that were used at the timing n and from the associated error e(n) and the FB signal $y_n$. In contrast, the coefficients of the term with the degree of 1 in the series are fixed to 1. These coefficients are set in each of the multipliers 432 and 434 and the adder 436.

By using the update process performed on the coefficients described above, the nonlinear inverse characteristic identification unit 430 identifies the nonlinear inverse characteristic of the electric power amplifier 160. Furthermore, the coefficients in the series are periodically duplicated to the nonlinear distortion compensation unit 410.

Figure 12:
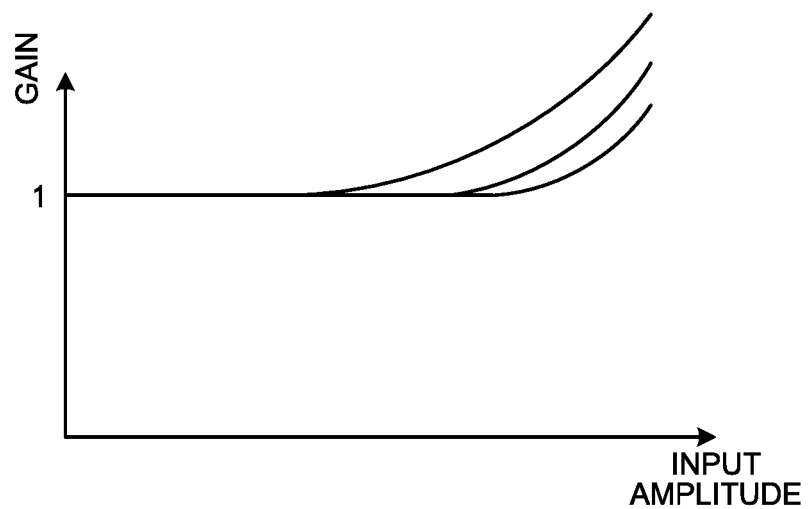
FIG. 12 is a block diagram illustrating a specific example of a nonlinear characteristic of a nonlinear inverse characteristic identification unit.
Figure 12:
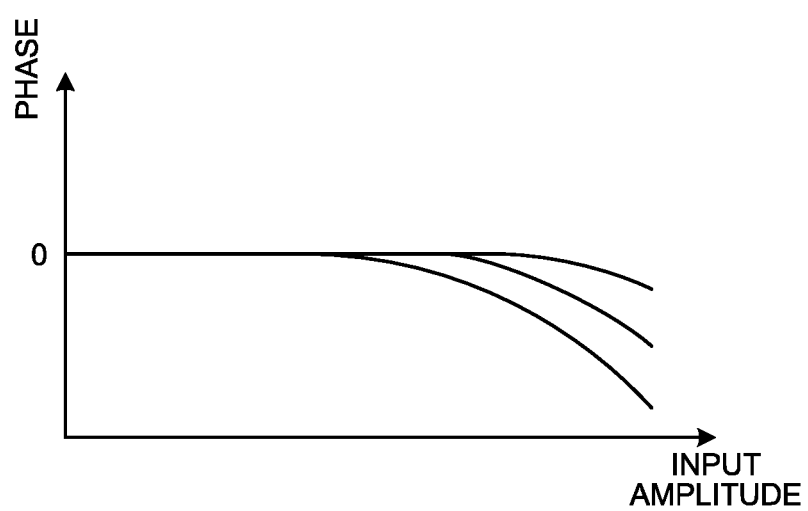

Here, by imposing the limitation in which the coefficients of the term with the degree of 1 are set to 1, the nonlinear characteristic of the nonlinear inverse characteristic identification unit 430 exhibits the gain characteristic and the phase characteristic illustrated in, for example, FIG. 12. The diagram illustrated in the upper part of FIG. 12 is a diagram illustrating an example of the gain characteristic of the nonlinear inverse characteristic identification unit 430. As illustrated in this diagram, the gain is fixed to 1 in the region, in which the input amplitude is small, regardless of the type of the nonlinear inverse characteristic identification unit 430. Similarly, the diagram illustrated in the lower part of FIG. 12 is a diagram illustrating an example of the phase characteristic of the nonlinear inverse characteristic identification unit 430. As illustrated in this diagram, the phase is fixed to zero in the region, in which the input amplitude is small, regardless of the type of the nonlinear inverse characteristic identification unit 430.

In this way, by imposing the limitation in which the coefficients of the term with the degree of 1 are set to 1, the nonlinear characteristic of the nonlinear inverse characteristic identification unit 430 passes through a fixed point and it is thus possible to uniquely decide the series coefficients and the tap coefficients of the frequency inverse characteristic identification unit 440. As a result, even if the coefficients related to linear distortion and nonlinear distortion are separately calculated, it is possible to perform stable distortion compensation. Furthermore, by imposing the limitation to the series coefficients of the nonlinear inverse characteristic identification unit 430, for example, the flexibility of adjusting the gain is decreased; however, fluctuations in the gain that is unable to be adjusted by the nonlinear inverse characteristic identification unit 430 is reflected to an update of the tap coefficients of the frequency inverse characteristic identification unit 440.

A description will be given here by referring back to FIG. 11. The frequency inverse characteristic identification unit 440 includes a plurality of delay devices 441, multipliers 442 to 444, and an adder 445. Furthermore, in the embodiment, the equalizer unit 420 also has the same configuration as that of the frequency inverse characteristic identification unit 440.

Each of the delay devices 441 outputs, after having held a sample of each of the signals, the held samples to the delay device 441 or the multiplier 442 that are placed in downstream thereof. Thus, when the latest sample of the FB signal is input to the frequency inverse characteristic identification unit 440 illustrated in FIG. 11, a past sample obtained at the 1-sample timing and a past sample obtained at the 2-sample timing are output from each of the delay devices 441.

The multiplier 442 multiplies the tap coefficient a1 by the past sample obtained at the 2-sample timing.

The multiplier 443 multiplies the tap coefficient a2 by the past sample obtained at the 1-sample timing.

The multiplier 444 multiplies the tap coefficient a3 by the latest sample of the FB signal.

The tap coefficients that are multiplied by the samples by the multipliers 442 to 444 are updated by the coefficient setting unit 450 such that the error calculated by the error calculation unit 125 is decreased.

Specifically, in a case where, for example, the LMS algorithm is used, tap coefficients a1, a2, and a3 are updated by using Equations (12) to (14).

$$a1(n+1)=a1(n)+e(n)y^*_{n-1} \quad (12)$$

$$a2(n+1)=a2(n)+e(n)y^*_n \quad (13)$$

$$a3(n+1)=a3(n)+e(n)y^*_{n+1} \quad (14)$$

In Equations (12) to (14), a1(n), a2(n), and a3(n) denote tap coefficients that are before the update, a1(n+1), a2(n+1), and a3(n+1) denote tap coefficients that are after the update. Furthermore, denotes a predetermined coefficient, e(n) denotes the error calculated by the error calculation unit 125, and $y^*_n$ denotes the complex conjugate of the FB signal $y_n$. In this way, new tap coefficients a1(n+1), a2(n+1), and a3(n+1) are calculated from the tap coefficients a1(n), a2(n), and a3(n) that were used at the timing n, from the associated error e(n), and from the FB signals $y_{n-1}$, $y_n$, and $y_{n+1}$ each of which includes one of the samples obtained between the previous and the subsequent timings. These tap coefficients are set in each of the multipliers 442 to 444.

By using the update process performed on the tap coefficients described above, the frequency inverse characteristic identification unit 440 identifies the frequency inverse characteristic of the electric power amplifier 160. Furthermore, the tap coefficients are periodically duplicated to the equalizer unit 420.

The adder 445 performs linear distortion compensation on the FB signal by summing the multiplication results obtained by the multipliers 442 to 444 and then generates a replica signal associated with a PD signal. If the series coefficients of the nonlinear distortion compensation unit 410 and the nonlinear inverse characteristic identification unit 430 and the tap coefficients of the equalizer unit 420 and the frequency inverse characteristic identification unit 440 are in an ideal state, the replica signal generated by the adder 445 and the PD signal output from the equalizer unit 420 are equal.

Figure 13:
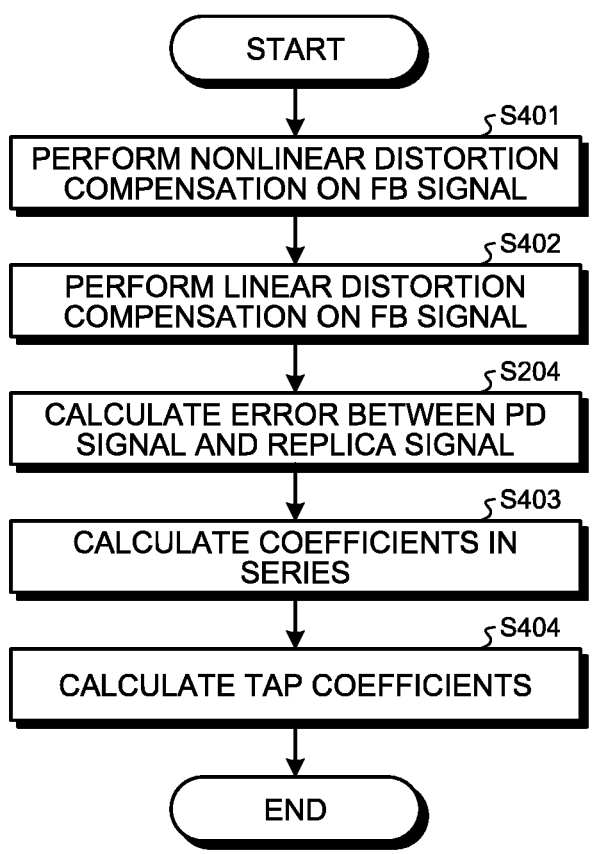
FIG. 13 is a flowchart illustrating an amplifier inverse characteristic identification process.

In the following, the amplifier inverse characteristic identification process will be described with reference to the flowchart illustrated in FIG. 13. In FIG. 13, the processes that are the same as those illustrated in FIG. 6 are assigned the same reference numerals. The amplifier inverse characteristic identification process illustrated in FIG. 13 is the process of separately identifying the nonlinear inverse characteristic and the frequency inverse characteristic of the electric power amplifier 160.

If the FB signal is input to the nonlinear inverse characteristic identification unit 430, nonlinear distortion compensation is performed on the FB signal because arithmetic calculation using a series in which the coefficients of the term with the degree of 1 are fixed to 1 (Step S401). The samples of the FB signal that has been subjected to the nonlinear distortion compensation are sequentially input to the frequency inverse characteristic identification unit 440. Then, a tap coefficient is multiplied by each of the samples at the associated sample timing while the samples of the FB signal are moving in the plurality of the delay devices 441. Namely, the tap coefficients are multiplied by the associated samples by the multipliers 442 to 444 and the multiplication results are added by the adder 445. Consequently, linear distortion compensation is performed on the FB signal (Step S402) and a replica signal associated with the PD signal is generated.

The generated replica signal is output to the error calculation unit 125 and then an error between the PD signal and the replica signal is calculated by the error calculation unit 125 (Step S204). This error is output to the coefficient setting unit 450 and then the coefficients that are included in the series and that are used for the nonlinear distortion compensation in the nonlinear inverse characteristic identification unit 430 are calculated by the coefficient setting unit 450 (Step S403). Namely, the series coefficients that allow the error to approach zero are calculated by using, for example, the LMS algorithm and are set in the multipliers 432 and 434. At this time, because the coefficients of the term with the degree of 1 in the series are fixed to 1, the coefficient setting unit 450 calculates the coefficients of the term with the degree of 3 or more in the series and then sets the calculated coefficients in the multiplier in the nonlinear inverse characteristic identification unit 430. In this way, by repeatedly updating the series coefficients that are used for arithmetic calculation by the nonlinear inverse characteristic identification unit 430, the nonlinear inverse characteristic of the electric power amplifier 160 is identified.

Furthermore, the tap coefficients that are used for linear distortion compensation in the frequency inverse characteristic identification unit 440 are calculated by the coefficient setting unit 450 (Step S404). Namely, the tap coefficients that allow the error to approach zero is calculated by using, for example, the LMS algorithm. In this way, by repeatedly updating the tap coefficients in the frequency inverse characteristic identification unit 440 described above, the frequency inverse characteristic of the electric power amplifier 160 is identified.

As described above, according to the embodiment, when the nonlinear inverse characteristic of the electric power amplifier is identified by updating the series coefficients and when the frequency inverse characteristic of the electric power amplifier is identified by updating the tap coefficients, indirect learning is performed in which the limitation in which the coefficients of the term with the degree of 1 is set to 1 is imposed and the updated series coefficients and the tap coefficients are periodically duplicated to the nonlinear distortion compensation unit and the equalizer unit. Consequently, it is possible to uniquely decide the distortion compensation coefficients that are used for nonlinear distortion compensation and that are included in the series and the tap coefficients that are used for equalization and perform stable distortion compensation even if the coefficients related to the linear distortion and the nonlinear distortion are separately calculated.

[d] Fourth Embodiment

The characteristic of a fourth embodiment is that, when an electric power amplifier is modeled by using a Hammerstein model in which linear distortion, nonlinear distortion, and linear distortion are sequentially generated, coefficients used for each of the pieces of distortion compensation are uniquely decided.

The radio communication system according to the fourth embodiment is the same as that described in the first embodiment (FIG. 1); therefore, descriptions thereof will be omitted. Furthermore, the radio communication device 100 according to the fourth embodiment has the same configuration as that of the radio communication device 100 (FIG. 2) according to the first embodiment except for the internal configuration of the processor 120.

Figure 14:
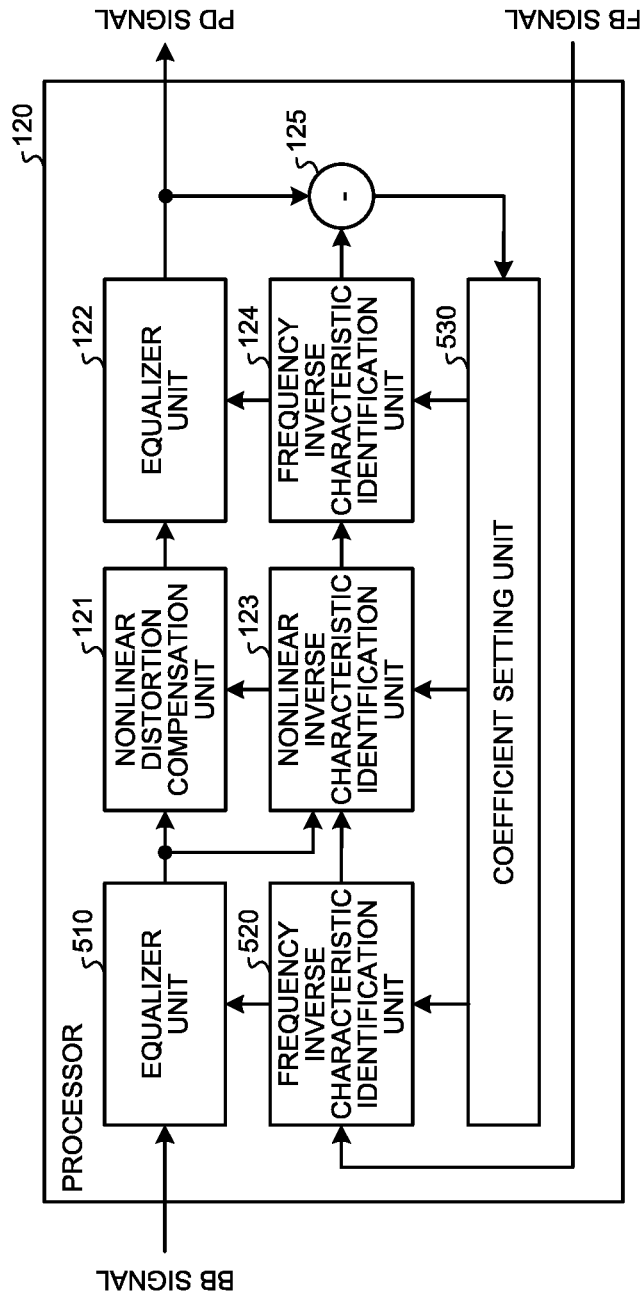
FIG. 14 is a block diagram illustrating an internal configuration of a processor according to a fourth embodiment.

FIG. 14 is a block diagram illustrating an internal configuration of the processor 120 according to the fourth embodiment. In FIG. 14, components that are the same as those illustrated in FIG. 2 are assigned the same reference numerals and descriptions thereof will be omitted. The processor 120 illustrated in FIG. 14 has a configuration in which an equalizer unit 510 and a frequency inverse characteristic identification unit 520 are added to the processor 120 illustrated in FIG. 2 and a coefficient setting unit 530 is included instead of the coefficient setting unit 126.

The equalizer unit 510 compensates linear distortion generated in the electric power amplifier 160. Specifically, the equalizer unit 510 includes an FIR filter that multiplies each of the tap coefficients by the plurality of temporally continuous signal samples, that obtains the sum thereof, and that equalizes the BB signal. The tap coefficients of the equalizer unit 510 are periodically replaced with the tap coefficients that are subjected to the update process in the frequency inverse characteristic identification unit 520, which will be described later.

Furthermore, the linear distortion compensated by the equalizer unit 510 is linear distortion generated in the downstream of the nonlinear distortion of the electric power amplifier 160, whereas the linear distortion compensated by the equalizer unit 122 is linear distortion generated in the upstream of the nonlinear distortion of the electric power amplifier 160.

The frequency inverse characteristic identification unit 520 identifies the frequency inverse characteristic of the electric power amplifier 160. Specifically, similarly to the equalizer unit 510, the frequency inverse characteristic identification unit 520 includes the FIR filter and updates the tap coefficients of the FIR filter such that the error calculated by the error calculation unit 125 is decreased. Furthermore, the frequency inverse characteristic identification unit 520 performs linear distortion compensation on the FB signal by equalizing the FB signal. Namely, the frequency inverse characteristic identification unit 520 performs an update process on the tap coefficients while performing, on the FB signal, the linear distortion compensation that is the same as that performed by the equalizer unit 510. Then, the frequency inverse characteristic identification unit 520 periodically duplicates the tap coefficients of the FIR filter included in the own unit to the equalizer unit 510.

Furthermore, the frequency inverse characteristic identified by the frequency inverse characteristic identification unit 520 is the frequency inverse characteristic that is associated with the linear distortion generated in the downstream of the nonlinear distortion in the electric power amplifier 160, whereas the frequency inverse characteristic identified by the frequency inverse characteristic identification unit 124 is the frequency inverse characteristic that is associated with the linear distortion generated in the upstream of the nonlinear distortion of the electric power amplifier 160.

The tap coefficients of the FIR filter included in the frequency inverse characteristic identification unit 520 are set by the coefficient setting unit 530; however, each of the coefficients is not set without limitation but is set under certain limitation. Namely, the update process is performed on the tap coefficients under the limitation in which the sum of a plurality of tap coefficients is set to 1 and the tap coefficient at the center is set to 1.

The coefficient setting unit 530 sets the distortion compensation coefficients stored in the LUT included in the nonlinear inverse characteristic identification unit 123 and the tap coefficients of the FIR filter in each of the frequency inverse characteristic identification unit 520 and the frequency inverse characteristic identification unit 124. At this time, the coefficient setting unit 530 updates the distortion compensation coefficients and the tap coefficients by using, for example, the LMS algorithm such that the error calculated by the error calculation unit 125 approaches zero. When updating the tap coefficients, the coefficient setting unit 530 calculates the tap coefficients of each of the FIR filters under the limitation, in which the sum of the tap coefficients of the frequency inverse characteristic identification unit 520 is set to 1 and the tap coefficient at the center is set to 1, and the limitation, in which the sum of the tap coefficients of the frequency inverse characteristic identification unit 124 is set to 1.

In the following, a specific example of an amplifier inverse characteristic identification unit according to the fourth embodiment will be described with reference to FIG. 15. The amplifier inverse characteristic identification unit according to the fourth embodiment is constituted by including the frequency inverse characteristic identification unit 520, the nonlinear inverse characteristic identification unit 123, and the frequency inverse characteristic identification unit 124.

Figure 15:
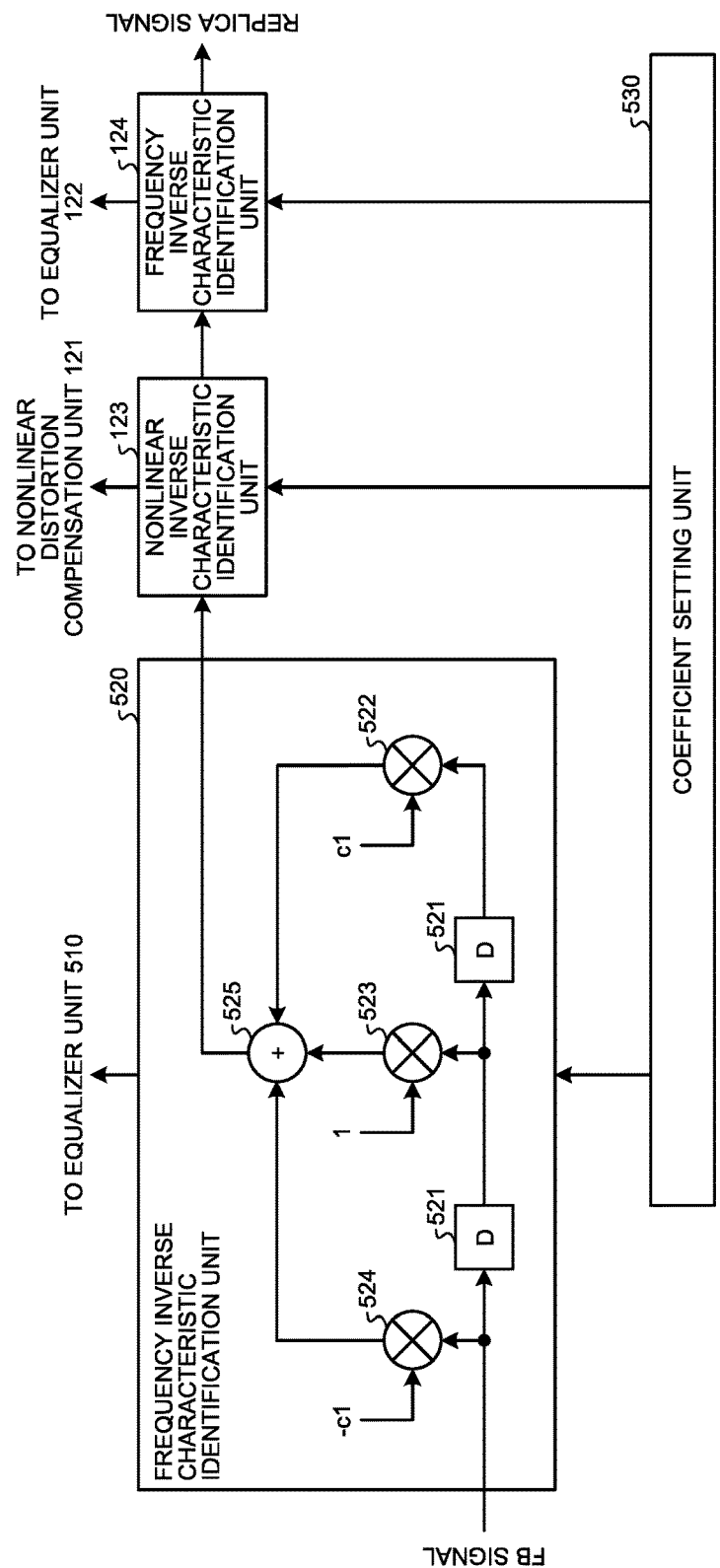
FIG. 15 is a block diagram illustrating a specific example of an amplifier inverse characteristic identification unit.

As illustrated in FIG. 15, the frequency inverse characteristic identification unit 520 includes a plurality of delay devices 521, multipliers 522 to 524, and an adder 525. Furthermore, in the embodiment, the equalizer unit 510 also has the configuration as that of the frequency inverse characteristic identification unit 520.

Each of the delay devices 521 outputs, after having held a sample of each of the signals, the held samples to the delay device 521 or the multiplier 522 that are placed in downstream thereof. Thus, when the latest sample of the FB signal is input to the frequency inverse characteristic identification unit 520 illustrated in FIG. 15, each of a past sample at a 1-sample timing and a past sample at a 2-sample timing is output from each of the delay devices 521.

The multiplier 522 multiplies a tap coefficient c1 by the past sample at the 2-sample timing.

The multiplier 523 is a multiplier that multiplies a tap coefficient by a past sample obtained at the 1-sample timing and multiplies, because this tap coefficient is the tap coefficient at the center, a fixed tap coefficient of 1. Namely, in the example illustrated in FIG. 15, because the frequency inverse characteristic identification unit 520 includes the FIR filter having three taps, the multiplier 523 associated with the tap coefficient at the center multiplies the fixed tap coefficient of 1 by the FB signal.

The multiplier 524 multiplies a tap coefficient −c1 by the latest sample. Namely, the multiplier 524 multiplies the tap coefficient that has been adjusted such that the sum of the three tap coefficients becomes 1 by the latest sample of the FB signal. If the frequency inverse characteristic identification unit 520 includes the FIR filter having three taps, in the embodiment, the tap coefficient at the center is fixed to 1; therefore, if the tap coefficient to be multiplied by the multiplier 522 is c1, by setting the tap coefficient multiplied by the multiplier 524 to −c1, the sum of the three tap coefficients becomes 1.

The tap coefficients multiplied by the samples by the multipliers 522 to 524 are updated by the coefficient setting unit 530 such that the error calculated by the error calculation unit 125 is decreased. Namely, the tap coefficient c1 and the tap coefficient −c1 are updated such that the error is decreased under the limitation in which the sum of the three tap coefficients is set to 1 and the tap coefficient at the center is further set to 1.

Specifically, in a case where, for example, the LMS algorithm is used, the tap coefficient c1 is updated by using Equation (15) below.

$$c1(n+1)=c1(n)+e(n)(y^*_{n-1}-y_{n+1}) \qquad (15)$$

In Equation (15), c1(n) denotes a tap coefficient that is before the update and c1(n+1) is a tap coefficient that is after the update. Furthermore, denotes a predetermined coefficient, e(n) denotes the error calculated by the error calculation unit 125, and $y^*_n$ denotes the complex conjugate of the FB signal $y_n$. In this way, new tap coefficient c1(n+1) is calculated from the tap coefficient c1(n) that was used at the timing n, from the associated error e(n), and from the FB signals $y_{n-1}$ and $y_{n+1}$ each of which includes one of the samples obtained between the previous and the subsequent timing. Then, the sign of the tap coefficient c1(n+1) is inverted, thereby the tap coefficients to be set in the multiplier 524 are calculated. These tap coefficients and the tap coefficient at the center indicating 1 are set in each of the multipliers 522 to 524.

By using the update process performed on the tap coefficients described above, the frequency inverse characteristic identification unit 520 identifies the frequency inverse characteristic associated with linear distortion that is generated in the downstream of the nonlinear distortion in the electric power amplifier 160. Furthermore, the tap coefficients are periodically duplicated to the equalizer unit 510.

Figure 16:
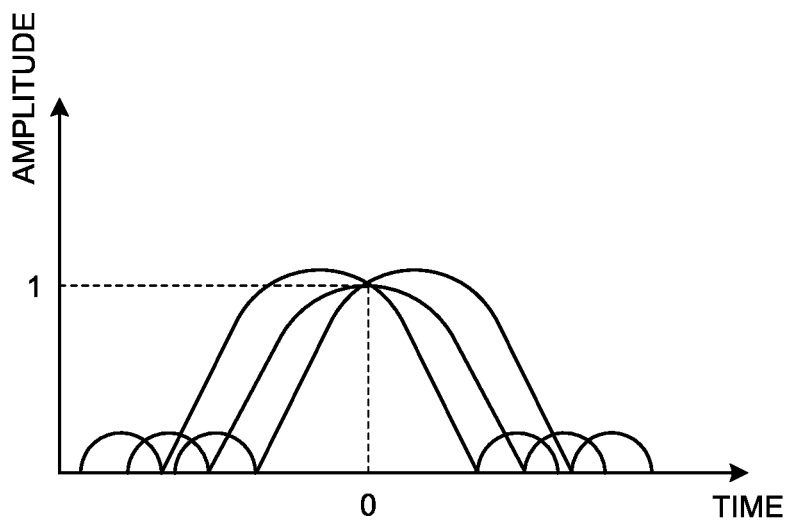
FIG. 16 is a block diagram illustrating a specific example of an impulse response of a frequency inverse characteristic identification unit.

Here, by imposing the limitation in which the tap coefficient at the center is set to 1, an impulse response of the frequency inverse characteristic identification unit 520 is such as that illustrated in, for example, FIG. 16. Namely, as illustrated in FIG. 16, the amplitude at time 0 is fixed to 1 and does not follow a delay time difference regardless of the type of the frequency inverse characteristic identification unit 520.

In this way, by imposing the limitation in which the tap coefficient at the center is set to 1, the frequency inverse characteristic identification unit 520 does not follow the delay time difference and it is thus possible to uniquely decide the tap coefficients of the frequency inverse characteristic identification units 520 and 124 and the distortion compensation coefficients of the nonlinear inverse characteristic identification unit 123. As a result, even if the coefficients related to the linear distortion and the nonlinear distortion are separately calculated, it is possible to perform stable distortion compensation. Furthermore, by imposing the limitation to the tap coefficients of the frequency inverse characteristic identification unit 520, the frequency inverse characteristic identification unit 520 does not follow the delay time difference; however, the delay time difference is reflected to the tap coefficients of the frequency inverse characteristic identification unit 124.

A description will be given here by referring back to FIG. 15. The adder 525 performs linear distortion compensation on the FB signal by summing the multiplication results obtained by the multipliers 522 to 524. The FB signal that has been subjected to the linear distortion compensation is output to the nonlinear inverse characteristic identification unit 123.

As described above, according to the embodiment, when identifying the frequency inverse characteristic associated with the linear distortion that is generated in the downstream of the nonlinear distortion of the electric power amplifier, the limitation in which the tap coefficient at the center is set to 1 is imposed. Consequently, even in a case where an electric power amplifier is also modeled by using a Wiener-Hammerstein model that sequentially generates linear distortion, nonlinear distortion, and linear distortion, it is possible to uniquely decide the distortion compensation coefficients and the tap coefficients that are used for equalization and perform stable distortion compensation.

Furthermore, in the fourth embodiment described above, the frequency inverse characteristic associated with the linear distortion that is generated in the downstream of the nonlinear distortion of the electric power amplifier is identified by the frequency inverse characteristic identification unit 520; however, if a transmission signal is a multicarrier signal including signals having a plurality of frequencies, it is possible to simplify the configuration of an amplifier inverse characteristic identification unit.

FIG. 17 is a block diagram illustrating a specific example of an amplifier inverse characteristic identification unit in a case where a transmission signal is a multicarrier signal. In FIG. 17, components that are the same as those illustrated in FIG. 2 and FIG. 15 are assigned the same reference numerals and descriptions thereof will be omitted. In the amplifier inverse characteristic identification unit illustrated in FIG. 17, the frequency inverse characteristic identification unit 520 in the amplifier inverse characteristic identification unit illustrated in FIG. 15 is replaced with a filter unit 610 and a level/phase adjusting unit 620. Furthermore, a multiplier 601 and a combining unit 602 are provided in the upstream of the nonlinear distortion compensation unit 121. Here, a description will be given with the assumption that the multicarrier signal includes signals having two different frequencies.

If a transmission signal is a multicarrier signal, when each of the BB signals associated with the corresponding frequencies are input to the processor 120, the multiplier 601 adjust the level and the phase of one of the BB signal, the combining unit 602 combines the two BB signals. As will be described later, the coefficients that are used by the multiplier 601 to adjust the level and the phase are acquired from the level/phase adjusting unit 620.

The filter unit 610 includes a band-pass filter associated with the frequency bands of the signals included in the multicarrier signal and separate the FB signal into signals each having a frequency band.

The level/phase adjusting unit 620 adjusts the level difference and the phase difference of each of the signals having different frequency bands, combines these signals, and then outputs the combined signal to the nonlinear inverse characteristic identification unit 123. Furthermore, the level/phase adjusting unit 620 periodically outputs, to the multiplier 601, the coefficients that are used to adjust the level difference and the phase difference. Specifically, the level/phase adjusting unit 620 includes a multiplier 621 and a combining unit 622.

The multiplier 621 multiplies a coefficient d by one of the signals that is obtained from the FB signal by being separated by the filter unit 610 and adjusts the level difference and the phase difference with the other one of the signals. The coefficient d multiplied by the multiplier 621 is set by a coefficient setting unit 630.

After the level and the phase of one of the signals have been adjusted by the multiplier 621, the combining unit 622 combines the combined signal and the other one of the signals.

The coefficient setting unit 630 sets, in addition to the distortion compensation coefficients of the nonlinear inverse characteristic identification unit 123 and the tap coefficients of the frequency inverse characteristic identification unit 124, a coefficient d of the level/phase adjusting unit 620. At this time, the coefficient setting unit 630 increases and decreases the coefficient d such that the error calculated by the error calculation unit 330 approaches zero.

In this way, if a transmission signal is a multicarrier signal, by adjusting the level difference and the phase difference of each of the signals having different frequency bands, it is possible to identify the frequency inverse characteristic that is associated with linear distortion generated in the downstream of nonlinear distortion of the electric power amplifier 160. Namely, by updating the coefficient d that is multiplied by the signal at the multiplier 621, it is possible to identify the frequency inverse characteristic in the same way as that performed by the frequency inverse characteristic identification unit 520 according to the fourth embodiment. Then, the coefficient d is periodically output to the multiplier 601 that adjusts the level difference and the phase difference of one of the BB signals and the multiplier 601 multiplies the coefficient d by the other one of the BB signals, thereby the BB signals are equalized.

Furthermore, in FIG. 17, the level difference and the phase difference between each of the BB signals and the FB signal are adjusted by the multiplier 601 and the multiplier 621; however, instead of the multiplier 601 and the multiplier 621, the equalizer unit 510 and the frequency inverse characteristic identification unit 520 according to the fourth embodiment may also be provided. In this case, only the signal that is associated with one of the frequencies of the multicarrier signal is processed after being input to the equalizer unit 510 and the frequency inverse characteristic identification unit 520 and is then combined to the other one of the signals. In this case, also, it is possible to stably compensate linear distortion and nonlinear distortion of the multicarrier signal.

In each of the embodiments described above, when the coefficients are set, the limitation in which the sum of the tap coefficients is set to 1 and the coefficients of the term with the degree of 1 in a series or the tap coefficient at the center is set to 1 is imposed. However, the coefficients are not always set to 1. Namely, if the limitation in which the sum of the tap coefficients and the coefficients of the term with the degree of 1 in a series or the tap coefficient at the center are constant is imposed, it is possible to uniquely decide the coefficients and stably perform distortion compensation.

Furthermore, the embodiments described above can be appropriately used in combination. Namely, the third and the fourth embodiments can be performed in direct learning described in the second embodiment. Furthermore, by combining the third and the fourth embodiments, when nonlinear distortion compensation is performed by using a series, it may also possible to compensate the linear distortion generated in the upstream and the downstream of the nonlinear distortion.

According to an aspect of an embodiment of the distortion compensation device and the distortion compensation method disclosed in the present invention, an advantage is provided in that, even when distortion compensation coefficients related to linear distortion and nonlinear distortion are separately obtained, it is possible to perform stable distortion compensation.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A distortion compensation device comprising:
    an electric power amplifier that amplifies a transmission signal; and
    a processor that executes a process including:
        first identifying, by using a series that includes a plurality of coefficients or by using a look-up table that stores therein distortion compensation coefficients, an inverse characteristic of nonlinear distortion generated in the transmission signal in the electric power amplifier;
        second identifying, by using a plurality of coefficients, an inverse characteristic of linear distortion generated in the transmission signal in the electric power amplifier; and
        setting the coefficients for the first identifying and the second identifying such that a coefficient of a term with a degree of 1 in the series used in the first identifying or a sum of the plurality of coefficients used in the second identifying is a constant.

2. The distortion compensation device according to claim 1, wherein the process further includes calculating an error between the transmission signal and a feedback signal that is fed back from the electric power amplifier, and
    the setting includes calculating the coefficients that are set for the first identifying and the second identifying such that the calculated error is decreased.

3. The distortion compensation device according to claim 2, wherein the process further includes:
    performing, on the transmission signal, compensation of the nonlinear distortion by using the inverse characteristic of the nonlinear distortion identified at the first identifying; and
    performing, on the transmission signal, compensation of the linear distortion by using the inverse characteristic of the linear distortion identified at the second identifying, wherein
    the calculating includes calculating the error between the transmission signal, in which the nonlinear distortion and the linear distortion are compensated, and the feedback signal that is used at the first identifying and the second identifying to identify the inverse characteristic of the nonlinear distortion and the inverse characteristic of the linear distortion.

4. The distortion compensation device according to claim 3, wherein
    the first identifying includes periodically duplicating the series or the look-up table used to identify the inverse characteristic of the nonlinear distortion for the compensation of the nonlinear distortion, and
    the second identifying includes periodically duplicating the plurality of coefficients used to identify the inverse characteristic of the linear distortion for the compensation of the linear distortion.

5. The distortion compensation device according to claim 2, wherein
    the first identifying includes performing, on the transmission signal, compensation of the nonlinear distortion by using the identified inverse characteristic of the nonlinear distortion,
    the second identifying includes performing, on the transmission signal, compensation of the linear distortion by using the identified inverse characteristic of the linear distortion, and
    the calculating includes calculating an error between the transmission signal, which is not subjected to the compensation of the nonlinear distortion and the linear distortion, and the feedback signal, which is fed back from the electric power amplifier.

6. The distortion compensation device according to claim 1, wherein
    the second identifying includes
        third identifying, by using a plurality of coefficients, an inverse characteristic of the linear distortion generated in the transmission signal in an upstream of the nonlinear distortion in the electric power amplifier, and
        fourth identifying, by using a plurality of coefficients, an inverse characteristic of the linear distortion generated in the transmission signal in a downstream of the nonlinear distortion in the electric power amplifier, and
    the setting includes fixing a single coefficient from among the plurality of coefficients used in the fourth identifying to a constant.

7. The distortion compensation device according to claim 1, wherein the process further includes:
    adjusting at least a level difference between a plurality of signals each having a different frequency included in the transmission signal; and
    compensating linear distortion generated in the transmission signal in a downstream of the nonlinear distortion in the electric power amplifier.

8. A distortion compensation method for compensating distortion generated in an electric power amplifier that amplifies a transmission signal, the distortion compensation method comprising:
    first identifying, by using a series that includes a plurality of coefficients or by using a look-up table that stores therein distortion compensation coefficients, an inverse characteristic of nonlinear distortion generated in the transmission signal in the electric power amplifier;
    second identifying, by using a plurality of coefficients, an inverse characteristic of linear distortion generated in the transmission signal in the electric power amplifier; and
    setting the coefficients for the first identifying and the second identifying such that a coefficient of a term with a degree of 1 in the series used in the first identifying or a sum of the plurality of coefficients used in the second identifying is a constant.

* * * * *